US010295941B2

(12) United States Patent
Sakata

(10) Patent No.: US 10,295,941 B2
(45) Date of Patent: May 21, 2019

(54) PRINTING SYSTEM, METHOD OF CONTROLLING PRINTING SYSTEM, AND NON-TRANSITORY COMPUTER-READABLE STORAGE MEDIUM

(71) Applicant: CANON KABUSHIKI KAISHA, Tokyo (JP)

(72) Inventor: Munetaka Sakata, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/142,307

(22) Filed: Apr. 29, 2016

(65) Prior Publication Data

US 2016/0238978 A1 Aug. 18, 2016

Related U.S. Application Data

(63) Continuation of application No. 14/737,939, filed on Jun. 12, 2015, now Pat. No. 9,346,257.

(30) Foreign Application Priority Data

Jun. 16, 2014 (JP) ................................ 2014-123818

(51) Int. Cl.
*B41F 19/02* (2006.01)
*G03G 15/00* (2006.01)
(Continued)

(52) U.S. Cl.
CPC .......... *G03G 15/5016* (2013.01); *B26F 1/00* (2013.01); *B41F 19/02* (2013.01); *B42C 1/12* (2013.01);
(Continued)

(58) Field of Classification Search
CPC ...................................................... B41F 19/02
(Continued)

(56) References Cited

U.S. PATENT DOCUMENTS 4,587,716 A * 5/1986 Bytow ................. B21D 37/145 483/14
5,342,276 A * 8/1994 Fujiwara ................ B21D 28/12 483/29

(Continued)

FOREIGN PATENT DOCUMENTS

JP 2002144670 A 5/2002
JP 2003182927 A 7/2003
JP 2005140841 A 6/2005

OTHER PUBLICATIONS

Notice of Allowance issued in U.S. Appl. No. 14/737,939 dated Jan. 26, 2016.

(Continued)

*Primary Examiner* — Anthony H Nguyen
(74) *Attorney, Agent, or Firm* — Rossi, Kimms & McDowell LLP

(57) ABSTRACT

A printing system is disclosed. The printing system includes a printing unit, a sheet processing unit, and a control unit. The sheet processing unit performs a designated sheet process for the printed sheet using a die that is manually selected by a user and attached to the sheet processing unit. When the die for performing the designated sheet process is not attached to the sheet processing unit, it is determined, before the printing unit starts printing the image on a first sheet on which the printing unit prints the image firstly among sheets on which the designated sheet process is to be performed, not to perform the designated sheet process for the sheets on which the designated sheet process is to be performed. The printing unit starts printing the image on the sheets on which the designated sheet process is to be performed after the determination.

10 Claims, 21 Drawing Sheets

(51) Int. Cl.

| | |
|---|---|
| ***B26F 1/00*** | (2006.01) |
| ***B42C 1/12*** | (2006.01) |
| *G03G 21/16* | (2006.01) |

(52) U.S. Cl.

CPC ......... *G03G 15/55* (2013.01); *G03G 15/6582* (2013.01); *G03G 21/16* (2013.01); *G03G 2215/00818* (2013.01)

(58) Field of Classification Search

USPC ............................................................ 101/30

See application file for complete search history.

(56) References Cited

U.S. PATENT DOCUMENTS

| | | | | |
|---|---|---|---|---|
| 7,869,065 | B2 | 1/2011 | Sugimoto et al. | |
| 7,900,543 | B2 * | 3/2011 | Ikeda | B21D 28/12 83/532 |
| 8,331,847 | B2 | 12/2012 | Matsushita et al. | |
| 8,385,758 | B2 * | 2/2013 | Nakai | G03G 15/5029 399/364 |
| 8,749,816 | B2 * | 6/2014 | Sunada | B41J 13/106 271/176 |
| 2002/0076459 | A1 * | 6/2002 | Joseph | B29C 47/0026 425/72.1 |
| 2002/0117060 | A1 * | 8/2002 | Steuer | B31F 1/07 101/9 |
| 2002/0126309 | A1 | 9/2002 | Shimada | |
| 2004/0108644 | A1 * | 6/2004 | Obregon | B42C 1/125 270/58.09 |
| 2005/0039585 | A1 | 2/2005 | Battisti et al. | |
| 2008/0181699 | A1 | 7/2008 | Ueda | |
| 2008/0250958 | A1 * | 10/2008 | Ruggiero | G03F 7/2012 101/401.1 |
| 2010/0266197 | A1 * | 10/2010 | Whiting | B42B 5/08 382/152 |
| 2011/0008089 | A1 * | 1/2011 | Watanabe | B26F 1/0092 399/407 |
| 2012/0067231 | A1 * | 3/2012 | Vandenberg | B26D 7/2614 101/26 |
| 2014/0033886 | A1 | 2/2014 | Hoover et al. | |

OTHER PUBLICATIONS

Office Action issued in Japanese Appln. No. 2014-123818 dated Apr. 2, 2018.

* cited by examiner

PRINTING SYSTEM, METHOD OF CONTROLLING PRINTING SYSTEM, AND NON-TRANSITORY COMPUTER-READABLE STORAGE MEDIUM

BACKGROUND OF THE INVENTION

Field of the Invention

The present invention relates to a printing system in which a sheet is conveyed to a sheet processing apparatus to which a die is set, a method of controlling a printing system, and a non-transitory computer-readable storage medium.

Description of the Related Art

Cases are increasing where post-processing by the sheet is applied by connecting to an image forming apparatus of a digital copying machine and a digital multifunction peripheral or the like to a post-processing device. As a kind of a post-processing device, there is an apparatus for performing hole punching of a square hole and a circular hole by the sheet, and normally is called a puncher unit or the like. Such a puncher unit is a post-processing device by which a user applies a desired punch process by exchanging a die for hole punching use. There exists a die that includes 19 square holes, a die that includes 44 circular holes or the like as dies for hole punching, and a user exchanges a die for hole punching in accordance with a desired punch process.

Puncher units in which a die for hole punching are exchanged are introduced in businesses and the like which perform mass printing as a main business, and often there exists a dedicated operator for a puncher unit. For this reason, a conventional puncher unit applies a punch process without concern for a number of holes or the hole punching shape, and management of die exchanging is left to an operation of a user.

Also, conventionally, there is an approach related to staple processing a print bundle (Japanese Patent Laid-Open No. 2002-144670). According to the approach of Japanese Patent Laid-Open No. 2002-144670, an image forming apparatus, on which multiple staple units for which the maximum number of sheets for stapling processing differ are mountable, prompts a user to exchange the staple unit with another staple unit in a case when it is determined that stapling processing is required that exceeds the maximum number of sheets of the staple unit that is currently mounted.

In recent years, by attaching different types of dies such as a die for hole punching, a die for creasing, a die for perforation, or the like, a post-processing device that makes various post-processing possible can be considered. It is envisioned that more variety of high definition printed material can be formed than conventionally by these apparatuses using a plurality of types of dies when forming one bundle of printed materials. An example of such a printed material is printed material on which creasing of a cover of a saddle stitch binding is performed, and perforation processing is applied in order to enable a user to tear off of a part of a body of the printed material.

In a case when printed material is formed, when the post-processing device performs processing without recognizing the type of die as is the case conventionally, there is a possibility that a saddle stitch binding for which perforation processing is applied to a cover, or a saddle stitch binding for which creasing processing is applied to a body will be formed. In other words, in order to prevent forming of such printed materials, an operator must continuously understand the content of a print job, and exchange a die at an appropriate timing.

However, it is very difficult for the operator to perform such work efficiently. Accordingly, there is a need to configure such that printed materials that are unexpected to a user are not formed while preventing the work efficiency of the operator from being reduced.

As described above, according to an approach of Japanese Patent Laid-Open No. 2002-144670, the image forming apparatus can prompt for the exchange of a staple unit in units of print bundles. However, the approach of Japanese Patent Laid-Open No. 2002-144670 does not determine a die that is required for sheet processing, or make possible exchange of a die.

SUMMARY OF THE INVENTION

The present invention was conceived in view of these kinds of problems, and provides a technique for making it possible to determine a required die for sheet processing and exchange a die as necessary when forming printed material.

According to one aspect of the present invention, there is provided a printing system in which a sheet is conveyed to a sheet processing apparatus to which a die is set, the system comprising: a printing unit configured to print an image on a sheet; a sheet processing unit configured to execute sheet processing using the die on the sheet to which the image is printed by the printing unit; a determination unit configured to determine whether or not a die used for executing designated sheet processing is set to the sheet processing apparatus; and a control unit configured to control to stop printing by the printing unit in a case where it is determined by the determination unit that the die is not set.

According to another aspect of the present invention, there is provided a method of controlling a printing system in which a sheet is conveyed to a sheet processing apparatus to which a die is set, the method comprising: a sheet processing step of executing sheet processing using the die on a sheet to which an image is printed; a determination step of determining whether or not a die used for executing designated sheet processing is set to the sheet processing apparatus; and a control step of controlling to stop printing in a case where it is determined in the determination step that the die is not set.

Further features of the present invention will become apparent from the following description of exemplary embodiments (with reference to the attached drawings).

DESCRIPTION OF THE EMBODIMENTS

Embodiments of the present invention will be described hereinafter in detail, with reference to the accompanying drawings. Note that embodiments described below merely illustrate examples of specifically implementing the present invention, and are only specific embodiments of a configuration defined in the scope of the claims.

Figure 1:
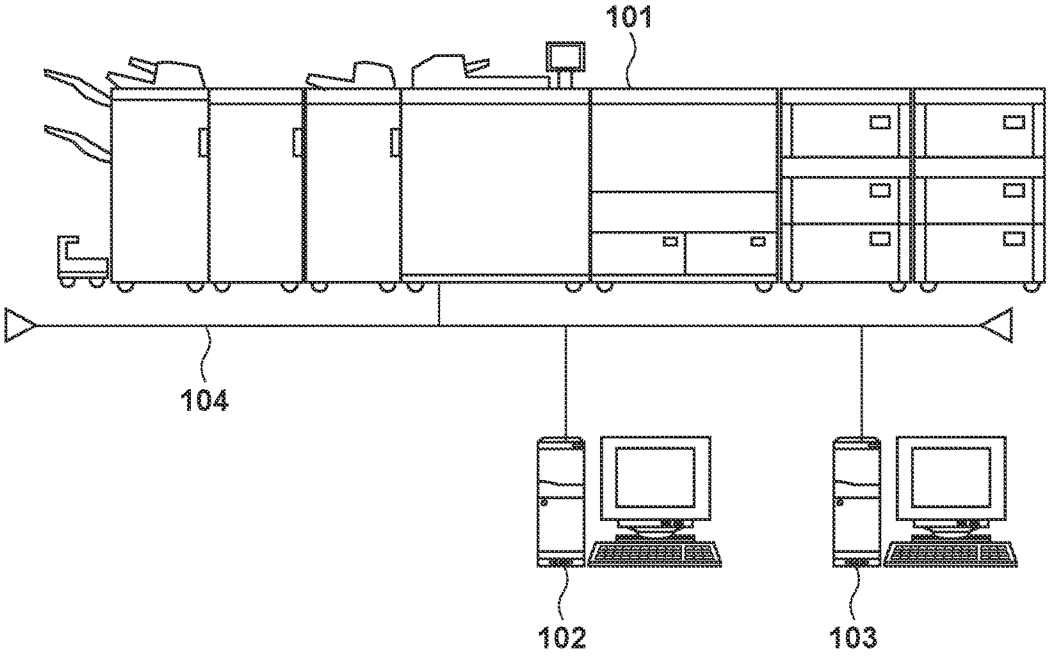
FIG. 1 is a view for illustrating an example configuration of an image forming system.

Before explaining each embodiment, an explanation will be given for items common to each embodiment. Firstly, an explanation will be given using FIG. 1 for an example configuration of the image forming system used in each embodiment below. As shown in FIG. 1, the image forming system according to the present embodiment includes an image forming apparatus 101, an image processing apparatus 102, and an information processing apparatus 103, and each apparatus is connected through a network 104 such as a LAN and Internet and the like Data communication between the apparatuses is possible through the network 104. Additionally, the number of instances of each apparatus is one in FIG. 1, however a configuration may be taken such that it is two or more.

Figure 2:
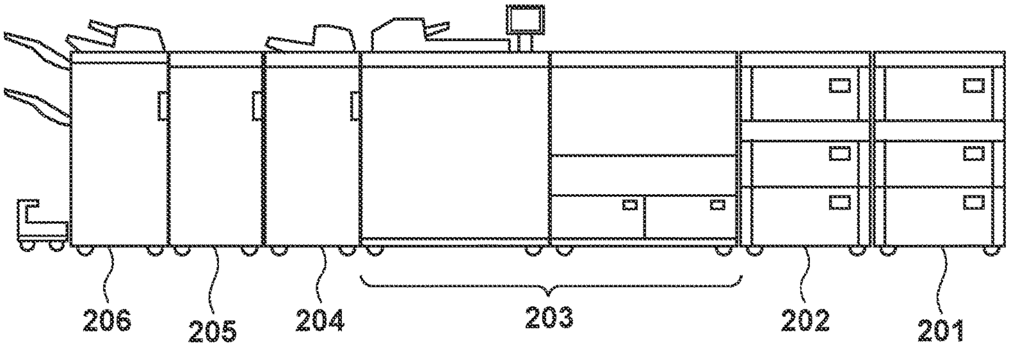
FIG. 2 is a view for illustrating an example configuration of an image forming apparatus 101.

Firstly, explanation will be given for the image forming apparatus 101. The image forming apparatus 101 as shown in FIG. 2 includes external sheet feeding apparatuses 201 and 202, an image forming apparatus main body 203, an inserter apparatus 204, a post-processing device 205, and a finisher apparatus 206, and as shown in FIG. 2, each are connected in series in this order from an upstream side.

The external sheet feeding apparatuses 201 and 202 are for providing a printing medium, such as paper set in the external sheet feeding apparatuses 201 and 202, to the image forming apparatus main body 203. The image forming apparatus main body 203 functions as a printing apparatus. Specifically, the image forming apparatus main body 203 performs printing based on a print job that is supplied from the image processing apparatus 102 on a printing medium that is supplied (fed) from a paper feed tray, or the like, included in an external sheet feeding apparatus 201, an external sheet feeding apparatus 202, and the image forming apparatus main body 203.

The inserter apparatus 204 is for conveying a printing medium such as paper or the like which is set to the inserter apparatus 204 to the post-processing device 205 or the finisher apparatus 206, without passing through the image forming apparatus main body 203. The inserter apparatus 204 is used when forming printed material such as a saddle stitch binding, for example, using a pre-print paper or the like printed by the image forming apparatus main body 203.

The post-processing device 205 is an apparatus for applying post-processing by the sheet for a printing medium that was discharged from the image forming apparatus main body 203 and the inserter apparatus 204. The finisher apparatus 206 is an apparatus for performing finishing processing such as punching and stapling or the like, and generating saddle stitch bindings, with respect to printing mediums discharged from the image forming apparatus main body 203, the inserter apparatus 204 or the post-processing device 205.

Figure 3:
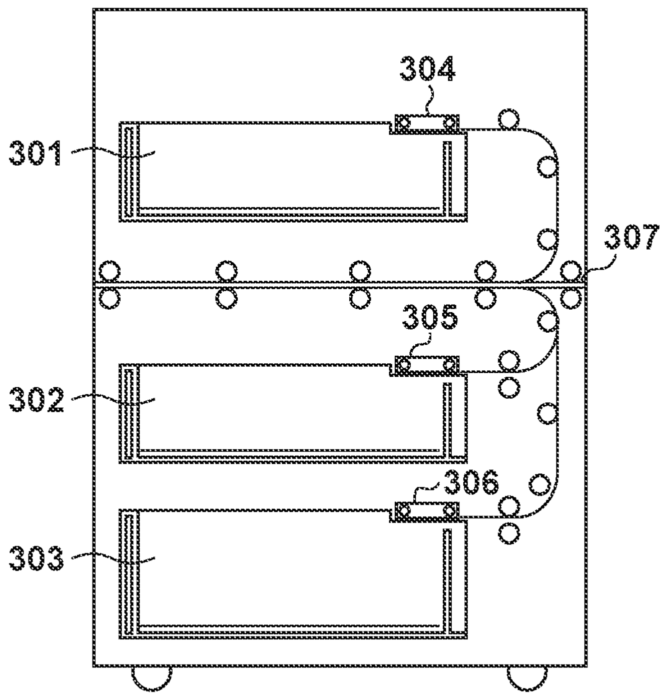
FIG. 3 is a cross-sectional view of external sheet feeding apparatuses 201 and 202.

Next, a more detailed explanation will be given for the external sheet feeding apparatuses 201 and 202. FIG. 3 is a cross-sectional view of the external sheet feeding apparatuses 201 and 202. Here, the external sheet feeding apparatus 201 and the external sheet feeding apparatus 202 are explained as having the same configuration, and a cross-sectional view thereof is shown in FIG. 3.

A straight path 307 is a path for conveying a printing medium that is conveyed from a sheet feeding tray 301, a sheet feeding tray 302, a sheet feeding tray 303, or an upstream side to a downstream side. For the present embodiment the external sheet feeding apparatus 201 is arranged on the upstream side of the external sheet feeding apparatus 202 and the image forming apparatus main body 203 is arranged on the downstream side of the external sheet feeding apparatus 202. For this reason, the external sheet feeding apparatus 202 conveys a printing medium that is contained inside the sheet feeding tray 301, the sheet feeding tray 302, or the sheet feeding tray 303, or a printing medium that is conveyed from the external sheet feeding apparatus 201, to the image forming apparatus main body 203 through the straight path 307. The sheet feeding tray 301, the sheet feeding tray 302, and the sheet feeding tray 303 are trays for feeding printing mediums. By lifting up a lower portion of the paper feed tray using a lift up motor (not shown), it is possible to cause a printing medium inside a paper feed tray to contact a sheet supplying motor 304, a sheet supplying motor 305, or a sheet supplying motor 306. By this arrangement, sheet feeding can be performed irrespective of the number of printing mediums. Each of the sheet supplying motor 304, the sheet supplying motor 305, and the sheet supplying motor 306 are motors that pull out printing medium that are contained inside the sheet feeding tray 301, the sheet feeding tray 302, and the sheet feeding tray 303 by the sheet. Printing mediums that are contained inside the sheet feeding tray 301, the sheet feeding tray 302, and the sheet feeding tray 303 are conveyed to the straight path 307 by being sent out by each of the sheet supplying motor 304, the sheet supplying motor 305, and the sheet supplying motor 306 to the conveying path.

Figure 4A:
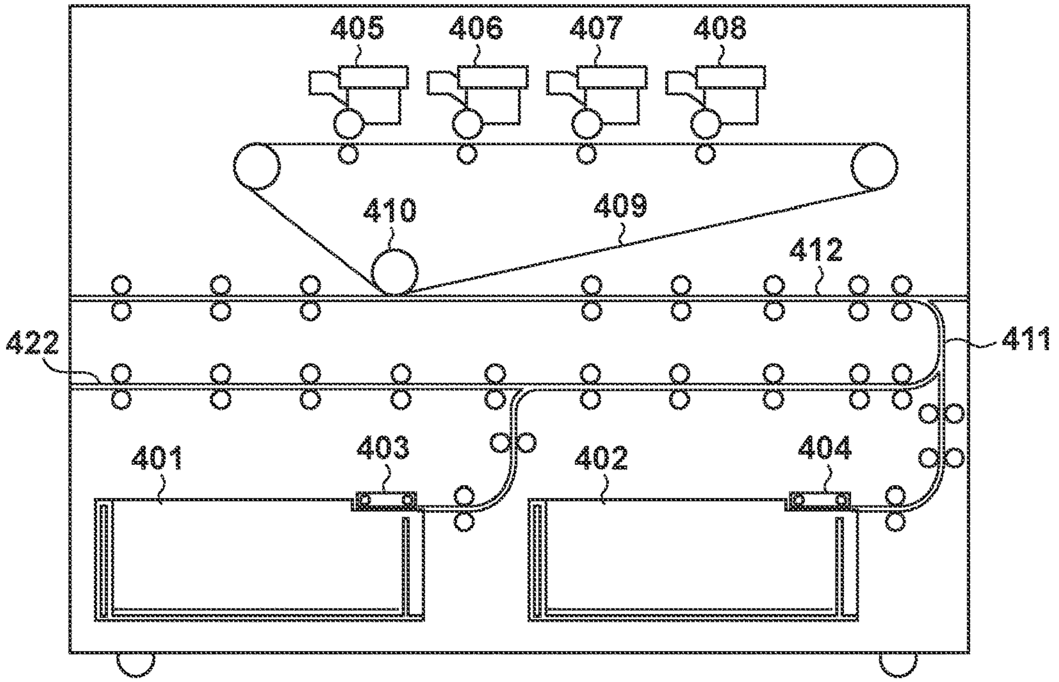
FIG. 4A is a cross-sectional view for an upstream side of an image forming apparatus main body 203.
Figure 4B:
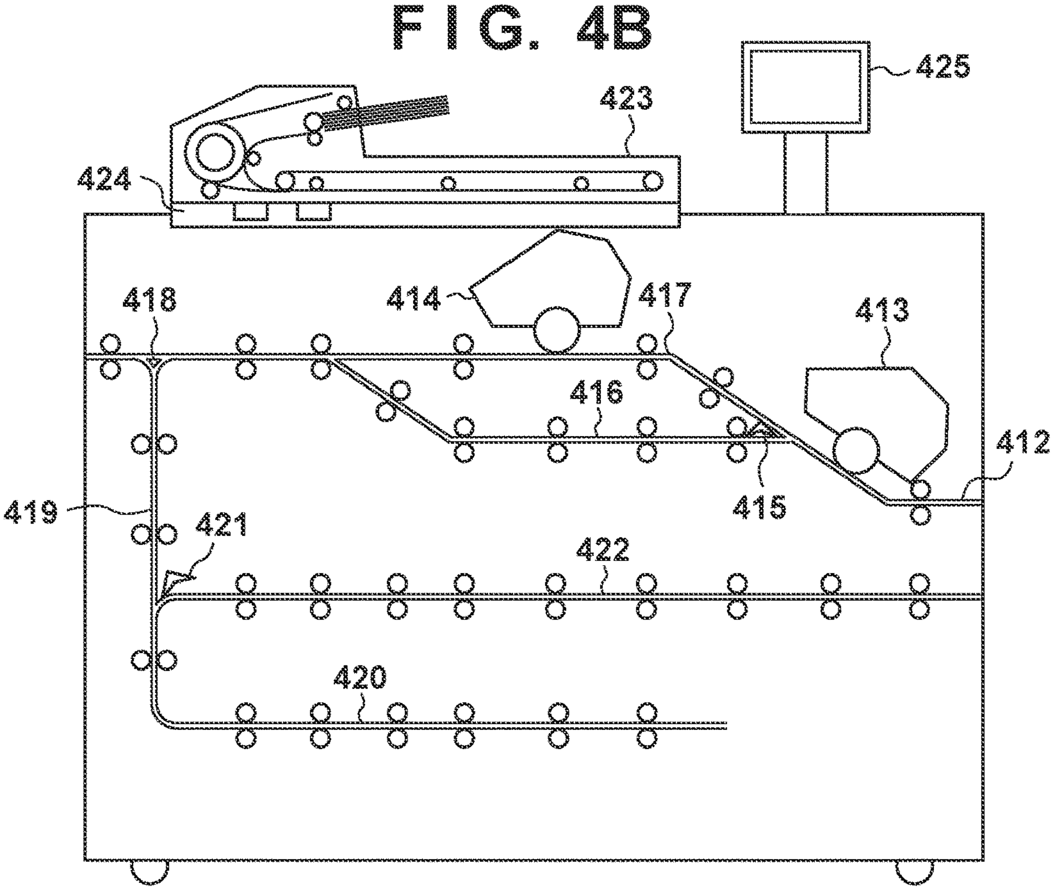
FIG. 4B is a cross-sectional view for a downstream side of the image forming apparatus main body 203.

Next, explanation will be given for the image forming apparatus main body 203. FIG. 4A and FIG. 4B are cross-sectional views of the image forming apparatus main body 203. FIG. 4A is a cross-sectional view for the upstream side of the image forming apparatus main body 203, and FIG. 4B is a cross-sectional view of the downstream side of the image forming apparatus main body 203. Here the upstream side indicates the side which is connected to the external sheet feeding apparatus 202, and the downstream side indicates the side which is connected to the inserter apparatus 204.

A sheet feeding tray 401 and a sheet feeding tray 402 are trays that feed printing mediums. By lifting up a lower portion of the paper feed trays (the sheet feeding tray 401 and the sheet feeding tray 402) using a lift up motor (not shown), it is possible to cause the printing mediums inside the sheet feeding tray 401 and the sheet feeding tray 402 to contact a sheet supplying motor 403 and a sheet supplying motor 404 respectively. By this arrangement, sheet feeding can be performed irrespective of the number of printing mediums.

Each of the sheet supplying motor 403 and the sheet supplying motor 404 are motors for pulling out printing medium contained inside the sheet feeding tray 401 and the sheet feeding tray 402 by the sheet. Printing mediums contained inside the sheet feeding tray 401 or the sheet feeding tray 402 are each conveyed to a conveying path 411 by being sent out to the conveying path by the sheet supplying motor 403 or the sheet supplying motor 404.

A conveying path 412 is a path for conveying a printing medium to a secondary transfer position 410. Also, the conveying path 412 is connected to the straight path 307 of the external sheet feeding apparatus 202. For this reason, printing mediums that are conveyed from the conveying path 411 and printing mediums that are conveyed through the straight path 307 of the external sheet feeding apparatus 202 are conveyed to the conveying path 412.

A developing unit 405, a developing unit 406, a developing unit 407, and a developing unit 408 are developing units for forming an image, and these are four colors stations for Y, M, C and K respectively. Here, in the figure, the formed image is primary transferred to an intermediate transfer belt 409 that is rotating in a clockwise direction, and the image is transferred to the printing medium that is conveyed to the conveying path 412 at the secondary transfer position 410.

The printing medium to which the image is transferred is conveyed to a first fixing unit 413 through the conveying path 412. In the first fixing unit 413, an image that is transferred is fixed to a printing medium by applying heat and pressurization to the printing medium to which the image was transferred.

A flapper 415 sorts the printing medium that passed through the first fixing unit 413 to a conveying path 416 or a conveying path 417. The flapper 415 is configured to be pivotable about a pivot shaft as a center, and defines a conveyance direction of the printing medium. When the flapper 415 pivots in a clockwise direction in the figure, the printing medium is conveyed to the conveying path 417, and when the flapper 415 pivots in a counterclockwise direction in the figure, the printing medium is conveyed to the conveying path 416.

Whether the printing medium that passed through the first fixing unit 413 is conveyed to the conveying path 416 or the conveying path 417 is determined according to a condition such as the type of the printing medium (if the grammage is large, or the like). In a case when it is determined that fixing is once again required, the printing medium is conveyed to the conveying path 417, and in a case when it is determined that fixing is not required once again, the printing medium is conveyed to the conveying path 416.

A second fixing unit 414 is an apparatus for applying heat and pressure once again to the printing medium that was conveyed to the conveying path 417.

A discharge flapper 418 is used for conveying a printing medium that was conveyed from the conveying path 416 or the conveying path 417 to the inserter apparatus 204 or a conveying path 419. The discharge flapper 418 is configured to be pivotable about a pivot shaft as a center, and defines a conveyance direction of the printing medium. When the discharge flapper 418 pivots in a clockwise direction in the figure, the printing medium is conveyed to the inserter apparatus 204, and when the flapper 418 pivots in a counterclockwise direction in the figure, the printing medium is conveyed to the conveying path 419.

A printing medium that was conveyed to the conveying path 419 is conveyed to a reversing path 420. Then by switchback processing, the conveyance direction of the printing medium is changed by 180 degrees.

A flapper 421 is configured to be pivotable about a pivot shaft as a center, and defines a conveyance direction of the printing medium. When the flapper 421 is pivoted in a clockwise direction in the figure, a printing medium that was conveyed from the reversing path 420 is conveyed to a conveying path 422.

The conveying path 422 is connected to the conveying path 411. In other words, since the printing medium is inverted at the reversing path 420, a front/back reversal of the print surface of the printing medium when the printing medium passes through the first fixing unit 413 and the second fixing unit 414 occurs. By this arrangement the image forming apparatus main body 203 performs double-sided printing.

In a case when the flapper 421 is pivoted in a counterclockwise direction in the figure, the printing medium passes through the conveying path 419. Then the discharge flapper 418 is pivoted in a counterclockwise direction in the figure and the printing medium is conveyed to the inserter apparatus 204. In other words, since the printing medium is inverted at the reversing path 420, the printing medium can be conveyed to the inserter apparatus 204 with the fixed image in a downward facing state. Additionally, a case in which the printing medium is conveyed to the inserter apparatus 204 in a state where the fixed image faces upward can be realized by not using the reversing path 420.

An automatic document feeder (ADF) 423 is a document feeder that separates in order of page order from a first original page of a batch of original documents that are set to a stacking surface of an original tray, and scans the original according to a scanner 424. The scanner 424 is an apparatus that irradiates light using a light source (not shown) on an original that is conveyed from the automatic document feeder 423, and reads in the original as an image (original document image) by a CCD (not shown). Image processing is applied to the original document image that was read, and a copy operation is executed using the developing unit 405, the developing unit 406, the developing unit 407 or the developing unit 408.

An operation panel 425 is an operation panel that is attached to the image forming apparatus main body 203, and the operation panel 425 is operated by a user in order to perform various operation input towards the image forming apparatus main body 203 (for example setting input and a start instruction input of a copy operation). Also, a display screen for displaying various information (for example a GUI (Graphical User Interface)) is formed on the operation panel 425, and for example the display screen is a touch panel screen.

Figure 5:
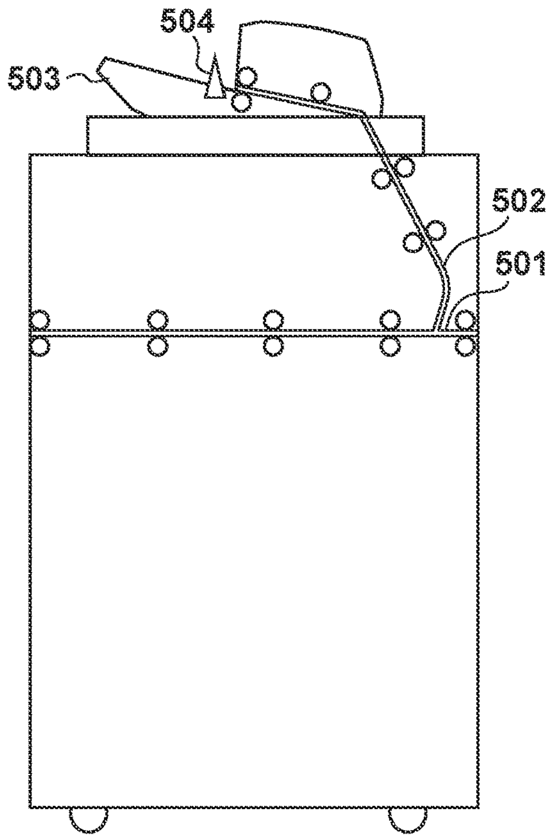
FIG. 5 is a cross-sectional view of an inserter apparatus 204.

Next, explanation will be given for the inserter apparatus 204. FIG. 5 is a cross-sectional view of the inserter apparatus 204. A straight path 501 is a path for conveying a printing medium that is conveyed from the upstream side to the downstream side. In the present embodiment, the printing medium received from the image forming apparatus main body 203 is conveyed to the post-processing device 205.

A conveying path 502 is a conveying path for conveying a printing medium fed to an inserter tray 503, and the conveying path 502 conveys the printing medium to the straight path 501. The inserter tray 503 is a tray for feeding a printing medium to which print processing is not performed by the image forming apparatus main body 203, to the post-processing device 205 and the finisher apparatus 206. A sheet detecting sensor 504 is a sensor for detecting whether or not a printing medium was fed to the inserter tray 503. Additionally, the inserter apparatus 204 comprises a conveyance roller, and a printing medium that is fed to the inserter tray 503 is conveyed from the conveying path 502 to the straight path 501. Then via the straight path 501, the printing medium is conveyed to the downstream side.

Figure 6:
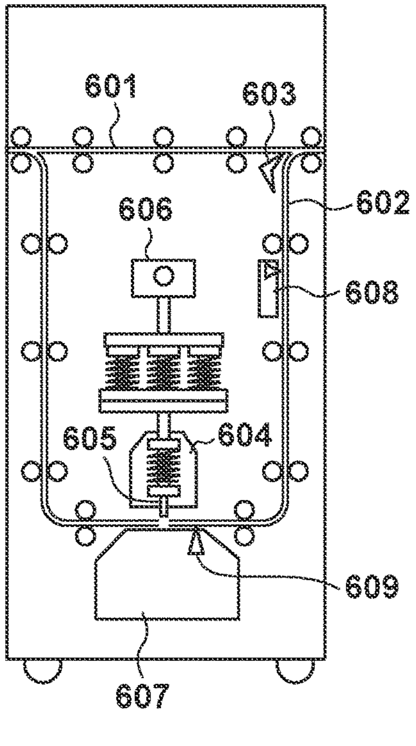
FIG. 6 is a cross-sectional view of a post-processing device 205.

Next, explanation will be given for the post-processing device 205. FIG. 6 is a cross-sectional view of the post-processing device 205. A straight path 601 is a path for conveying a printing medium that is conveyed from the upstream side to the downstream side. According to the present embodiment, a printing medium that is received from the inserter apparatus 204 is conveyed to the finisher apparatus 206.

A conveying path 602 is a conveying path for conveying a printing medium that is a target of post-processing. A flapper 603 is for sorting printing mediums conveyed from the inserter apparatus 204 to the straight path 601 or the conveying path 602. The flapper 603 is configured to be pivotable about a pivot shaft as a center, and defines a conveyance direction of the printing medium. When the flapper 603 pivots in a clockwise direction in the figure, the printing medium is conveyed to the straight path 601, and when the flapper 603 pivots in a counterclockwise direction in the figure, the printing medium is conveyed to the conveying path 602.

A die for post-processing 604 is a die for applying post-processing to a printing medium, and comprises a blade 605 for applying post-processing. In the present embodiment, there exist three types of the die for post-processing 604: a die for creasing, a die for perforation, and a die for punching.

The shape of the blade 605 differs based on a type of die. For example, in the case of the die for creasing, the blade 605 is a blade that is rounded off so to not cut a printing medium. In the case of the die for perforation, the blade 605 is a blade arranged in an uneven blade shape that cuts the printing medium in order to form a perforation. In the case of the die for punching, the blade 605 is arranged with multiple blades in a series that are for punching round holes.

The die for post-processing 604 is removable from the post-processing device 205, and it can be detected whether or not the die for post-processing 604 is attached to the post-processing device 205 by a later explained sensor. Also, by this sensor, the type of the die that is attached to the post-processing device 205 can be uniquely recognized.

A pressure apparatus 606 is an apparatus for applying pressure to the die for post-processing 604. A base 607 is a base for receiving the blade 605. A conveying speed control unit 608 is a unit for controlling a conveyance speed of a printing medium to a predetermined speed, and includes a sensor for detecting the conveyance speed of the printing medium inside the unit. A detection sensor 609 is a sensor for detecting a leading edge of the printing medium being conveyed.

The post-processing device 205 performs an operation as below in a case when post-processing is applied to the printing medium. First, the conveying speed control unit 608 has a sensor that detects the conveyance speed of the printing medium, and the conveying speed control unit 608 causes the conveyance speed to accelerate or decelerate of the printing medium that passes through the conveying path 602 to match a predetermined speed. Then when the detection sensor 609 has detected that a leading edge of the printing medium that is being conveyed at the predetermined speed, the pressure apparatus 606 applies pressure towards the die for post-processing 604 from the upper side to the lower side in the figure.

Pressure applied to the die for post-processing 604 by the pressure apparatus 606 is conveyed to the blade 605. Then the blade 605 transitions from the upper side to the lower side in the figure, and realizes post-processing in accordance with the blade 605 (creasing, perforation, punching or the like) by sandwiching the printing medium between the blade 605 and the base 607.

Additionally, the post-processing device 205 can apply post-processing at an arbitrary position in the conveyance direction of the printing medium. More specifically, it is possible to realize this by performing the following control. A printing medium conveyed along the conveying path 602 is controlled to a predetermined conveyance speed by the conveying speed control unit 608. Also, the timing for performing post-processing by the blade 605 can be calculated by dividing a value that is obtained from adding a distance between the detection sensor 609 and the blade 605 with a post-processing position (the distance from the leading edge of the printing medium), and performing division by the value of the above-described default conveyance speed. In other words, the pressure apparatus 606 is driven based on a timing at which the leading edge of the printing medium is detected by the detection sensor 609, and such that the printing medium is caused to contact the blade 605 at the above described calculated timing.

Figure 7:
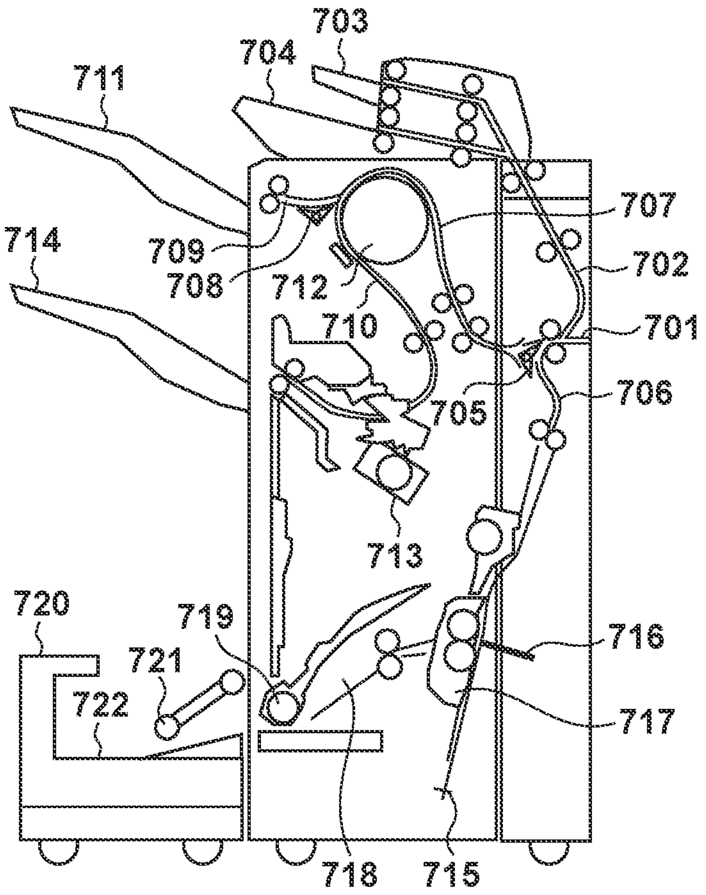
FIG. 7 is a cross-sectional view of a finisher apparatus 206.

Next, explanation will be given for the finisher apparatus 206. FIG. 7 is a cross-sectional view of the finisher apparatus 206. A conveying path 701 is a path that conveys a printing medium that was conveyed from the upstream side to the inside of the finisher apparatus 206. In the present embodiment the finisher apparatus 206 conveys a printing medium that was received by the post-processing device 205 to the inside of the finisher apparatus 206.

A conveying path 702 is a conveying path for conveying a printing medium that was fed to an inserter tray 703 or an inserter tray 704 to the conveying path 701. The inserter tray 703 and the inserter tray 704 are trays to which it is possible to feed a printing medium that is already printed when generating a resulting document such as punching, stapling and saddle stitch binding using a printing medium that is already printed.

A flapper 705 is configured to be pivotable centered around a pivot shaft, and defines a conveyance direction of the printing medium that is conveyed through the conveying path 701 or the conveying path 702. When the flapper 705 pivots in a counterclockwise direction in the figure, the printing medium is conveyed to a conveying path 706. When the flapper 705 pivots in a counterclockwise direction in the figure, the printing medium is conveyed to a conveying path 707.

A flapper 708 is configured to be pivotable centered around a pivot shaft, and defines a conveyance direction of the printing medium that is conveyed through the conveying path 707. When the flapper 708 pivots in a counterclockwise direction in the figure, the printing medium is conveyed to a conveying path 710. When the flapper 708 pivots in a clockwise direction in the figure, the printing medium is conveyed to a conveying path 709.

The conveying path 709 is a conveying path for conveying a printing medium to a sample tray 711. The conveying path 710 is a conveying path for conveying a printing medium to a sample tray 714. The sample tray 711 is a tray on which the printing medium that passed through the conveying path 709 is discharged.

A printing medium that was conveyed to the conveying path 710 passes through a puncher 712 and a stapler 713, and is conveyed to the sample tray 714. The puncher 712 is an apparatus for applying a punch process to the printing medium that passes through the conveying path 710.

The puncher 712 can perform the punch process for a printing medium, and includes an exchangeable blade (not shown) having 2 holes or 3 holes or the like. The stapler 713 is an apparatus for stacking the printing medium that passes through the conveying path 710, and applying stapling processing (staple processing). The stapler 713 comprises replenishable blades (not shown), and makes possible various stapling processes such as corner stapling, two location stapling, or the like.

The sample tray 714 is a tray on which the printing medium that passed through the conveying path 710 is discharged. The conveying path 706 is a conveying path for conveying a printing medium when applying saddle stitching processing. A stopper 715 is a stopper for stopping a printing medium that is conveyed from the conveying path 706. The stopper 715 can adjust a length from the stopper 715 to a folding plate 716 by a motor (not shown). Normally, a length is set to one half the conveyance direction length of the printing medium to which saddle stitching processing is applied. In other words, the saddle stitching processing is applied to the middle of the printing medium to which saddle stitching processing is applied.

The folding plate 716 is an apparatus for pressing a printing medium that has been stopped at the stopper 715 into a saddle stitcher 717. The saddle stitcher 717 is an apparatus for applying stapling processing and folding processing to a printing medium that has been pushed by the folding plate 716. By operation of the stopper 715 and the folding plate 716, the middle of the printing medium is folded and enters the saddle stitcher 717. For this reason, once passing through the saddle stitcher 717, the printing medium to which saddle stitching processing is applied is conveyed to a stacking unit 718. Then, the printing medium to which saddle stitching processing is applied is discharged to a saddle tray 720 from the stacking unit 718 by a discharging roller 719.

A guide 721 has an operation for storing, and sending printing mediums to which saddle stitching processing is applied to a saddle stacking unit 722 sequentially one volume at a time. The saddle stacking unit 722 stores a large number of the printing medium to which saddle stitching processing was applied.

Figure 8:
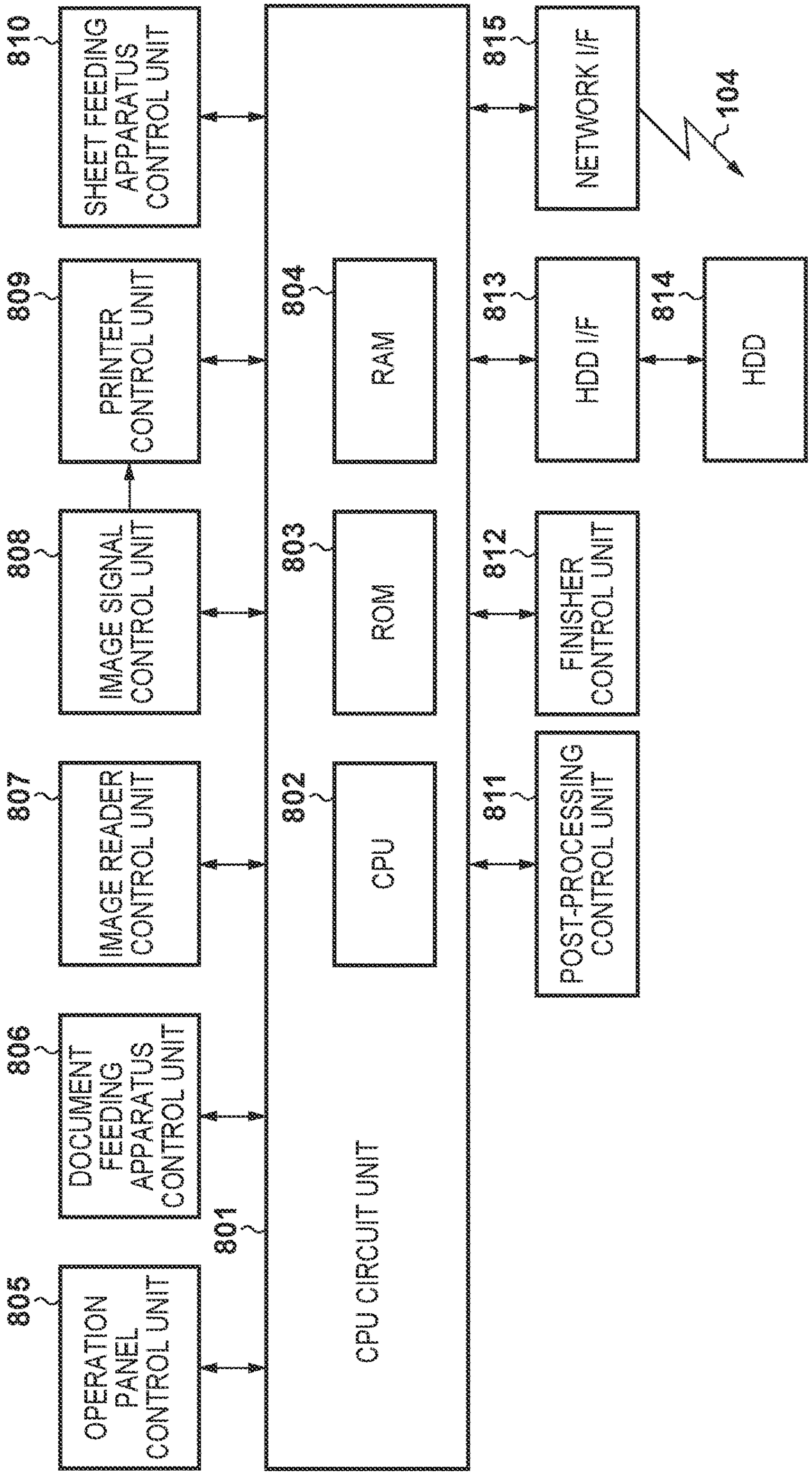
FIG. 8 is a block diagram for showing an example of a hardware configuration of an image forming apparatus main body 203.

Next, for a hardware configuration example of the image forming apparatus main body 203, an explanation is given using a block diagram of FIG. 8. Additionally, FIG. 8 shows a main configuration associated with operation of the image forming apparatus main body 203 explained below, and does not show all configurations that the image forming apparatus main body 203 includes. Also, the configuration shown in FIG. 8 is merely one example, and another configuration may also be employed if it makes possible equivalent or greater operation.

A CPU circuit unit 801 includes a CPU 802, a ROM 803, and a RAM 804. The CPU 802 uses a computer program and data stored in the ROM 803 and the RAM 804 for performing processing to perform operation control of all of the image forming apparatus main body 203 and additionally performs and controls each processing, which will be explained later as being performed by the image forming apparatus main body 203.

For example, the CPU 802 realizes control corresponding to printing by performing operation control of an operation panel control unit 805, a document feeding apparatus control unit 806, an image reader control unit 807, an image signal control unit 808, a printer control unit 809, and a sheet feeding apparatus control unit 810. Also, the CPU 802 realizes control corresponding to the forming of printed materials by performing operation control of a post-processing control unit 811 and a finisher control unit 812. The CPU 802 realizes internal and external interface control by performing operation control of an HDD I/F 813 for controlling an HDD 814, and a network I/F 815.

A computer program and data is stored in the ROM 803 for the CPU 802 to realize each process which will be explained later as being performed by the image forming apparatus main body 203. The data and computer programs that are stored in the ROM 803 are loaded as appropriate to the RAM 804 in accordance with control by the CPU 802, and are targets of processing by the CPU 802.

The RAM 804 includes an area for storing computer programs and data that is loaded from the ROM 803 and the HDD 814, as well as an area for storing data received from an external unit through the network I/F 815. Furthermore, the RAM 804 includes a work area that is used in a case when the CPU 802 performs various processing. In this way, the RAM 804 can provide various areas appropriately.

The operation panel control unit 805 controls the operation panel 425. The document feeding apparatus control unit 806 controls the automatic document feeder (ADF) 423. The image reader control unit 807 controls the scanner 424. After the image signal control unit 808 applies image processing to image data that was read by the scanner 424, the printer control unit 809 converts the image data to an image signal that can be interpreted by the printer control unit 809, and performs control to pass the result to the printer control unit 809. The printer control unit 809 controls the developing unit 405, the developing unit 406, the developing unit 407, the developing unit 408, the first fixing unit 413, and the second fixing unit 414 and the like, and realizes printing according to the image signal received from the image signal control unit 808. The sheet feeding apparatus control unit 810 controls the external sheet feeding apparatus 201, the external sheet feeding apparatus 202, the paper feed tray of the image forming apparatus main body 203, and the inserter apparatus 204.

The post-processing control unit 811 controls the post-processing device 205. The finisher control unit 812 controls the finisher apparatus 206. The HDD I/F 813 is an interface with the HDD 814, and controls reading out and writing towards the HDD 814. The HDD 814 stores an OS (operating system), various computer programs and data, as well as non-volatile computer programs and data.

The network I/F 815 is for connecting the apparatus to the network 104 described above, and through the network I/F 815, the apparatus performs data communication with other apparatuses that are connected to the network 104 described above. In the present embodiment, data communication can be performed with the image processing apparatus 102 and the information processing apparatus 103 through the network 104.

Firstly, an explanation will be given for control of each control unit by the CPU 802 during a copy operation. The CPU 802 controls the document feeding apparatus control unit 806 when it receives a copy instruction from the operation panel control unit 805, and feeds a batch of original documents one sheet at a time to the automatic document feeder (ADF) 423. Then the CPU 802 controls the image reader control unit 807 and the scanner 424 it caused to generate an original document image by reading the fed original. Then the CPU 802 transfers the original document image that was generated to the RAM 804 to the image signal control unit 808, which temporarily stores the image. Then the CPU 802 controls the image signal control unit 808, causing it to convert the original document image into an image signal that the printer control unit 809 can interpret, and causing it to send the converted image signal to the printer control unit 809. Then the CPU 802 controls the sheet feeding apparatus control unit 810 causing it to feed a printing medium from the external sheet feeding apparatus 201, the external sheet feeding apparatus 202 or the like to the sheet feeding apparatus control unit 810.

The printer control unit 809 controls the developing unit 405, the developing unit 406, the developing unit 407, the developing unit 408, the first fixing unit 413, the second fixing unit 414 or the like. With this, an image is formed according to the image signal received from the image signal control unit 808, on the printing medium that was fed from the external sheet feeding apparatus 201, the external sheet feeding apparatus 202 or the like.

Then the CPU 802 controls the post-processing control unit 811 and the finisher control unit 812, and realizes printed material formation processing on the printing medium on which the image was formed. For example, in a case when applying post-processing by the sheet for a printing medium, the CPU 802 controls the post-processing control unit 811, and executes post-processing such as punching (hole punching), creasing, and perforation. Also in a case when formation processing is performed on the finisher apparatus 206, the CPU 802 controls the finisher control unit 812 to apply processing according to finishing settings that are designated such as saddle stitching and two hole punching. Then a printing medium to which the processing is applied is caused to be discharged to one of the sample tray 711, the sample tray 714, or the saddle stacking unit 722 according to a designated discharge destination setting.

Next, an explanation will be given for control of each control unit by the CPU 802 during a print operation. When the CPU 802 receives a print image from the image processing apparatus 102 through the network I/F 815, a print image is stored temporarily to the RAM 804 and transferred to the image signal control unit 808. After this, the same operation is performed as is during a copy operation.

Figure 9:
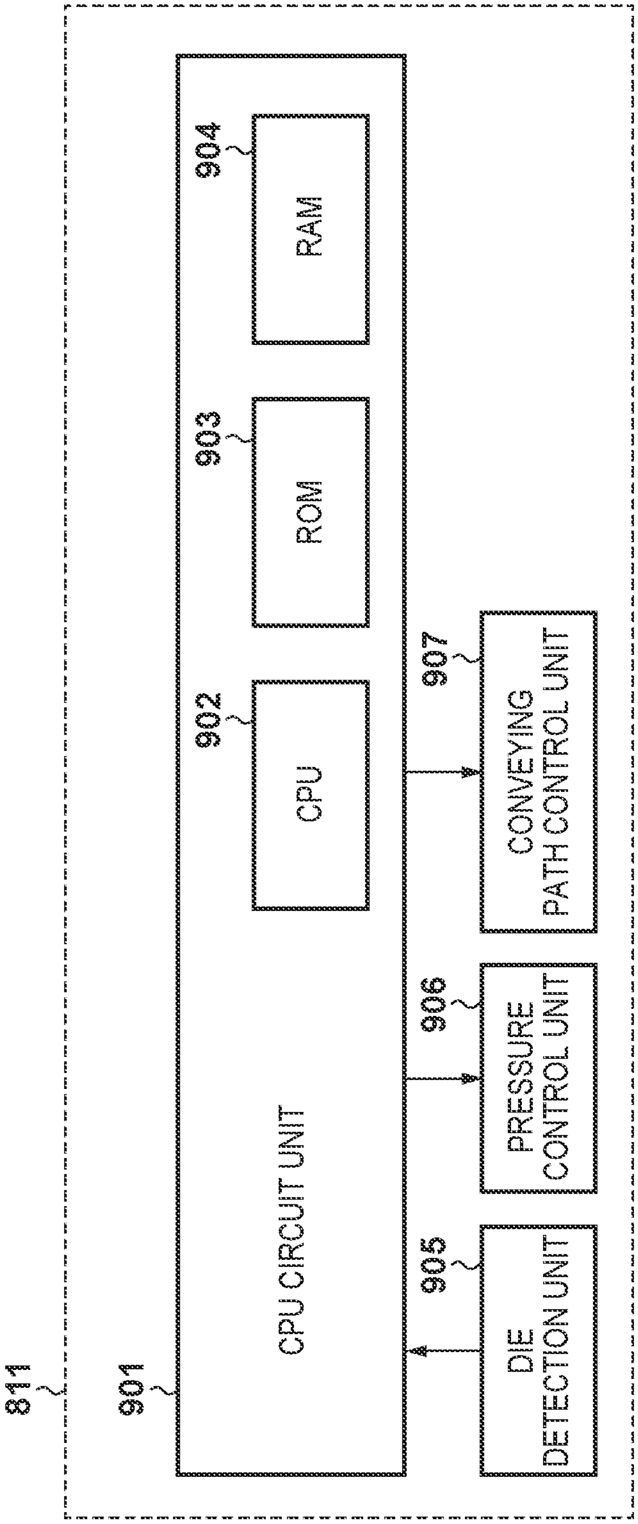
FIG. 9 is a block diagram for showing an example of a hardware configuration of the post-processing device 205.

Next, for a hardware configuration example of the post-processing device 205, an explanation is given using a block diagram of FIG. 9. Additionally, FIG. 9 shows a main configuration associated with operation of the post-processing device 205 explained below, and does not show all configurations included by the post-processing device 205. Also, the configuration shown in FIG. 9 is merely one example, and another configuration may also be employed if it makes possible equivalent or greater operation.

A CPU circuit unit 901 includes a CPU 902, a ROM 903, and a RAM 904. By performing processing using computer programs and data that is stored in the RAM 904, the ROM 903, and the CPU 902, in addition to performing operation control of the apparatus on the whole, also controls or performs processing which will be explained later as being performed by the post-processing device 205. Also, when the CPU 902 receives an instruction from the CPU 802 of the image forming apparatus main body 203, the CPU 902 performs control processing according to each instruction.

Computer programs and data are stored in the ROM 903 for the CPU 902 to execute each process which will be explained later as being performed by the post-processing device 205. The data and computer programs that are stored in the ROM 903 are loaded as appropriate into the RAM 904 in accordance with control by the CPU 902, and are targets of processing by the CPU 902.

The RAM 904 includes an area for storing computer programs and data that are loaded from the ROM 903, as well as a work area used when the CPU 902 performs various types of processing. In other words, the RAM 904 can provide various areas appropriately.

A die detection unit 905 is for detecting what type of the die for post-processing 604 is mounted to the post-processing device 205, and this detection includes of course detection of whether or not the die for post-processing 604 is mounted to the post-processing device 205. For example, the die detection unit 905 can distinguish as to whether the die mounted to the post-processing device 205 is the die for punching (hole punching), the die for creasing, or the die for perforation.

A pressure control unit 906 realizes post-processing by applying pressure to the die for post-processing 604, and controls the pressure apparatus 606. A conveying path control unit 907 controls the flapper 603 and the conveying speed control unit 608, and performs switching of a conveying path of a printing medium as well as control of a conveyance speed.

In other words, the CPU circuit unit 801 is configured to be able to centrally control the die detection unit 905, the pressure control unit 906, and the conveying path control unit 907 through the CPU circuit unit 901, and can control post-processing such as hole punching and the like, as well as conveying path control for the post-processing device 205.

In this way, the image forming apparatus 101, after performing printing processing based on print jobs received in various forms, can perform post-processing as necessary on each sheet obtained from each printing.

Figure 10:
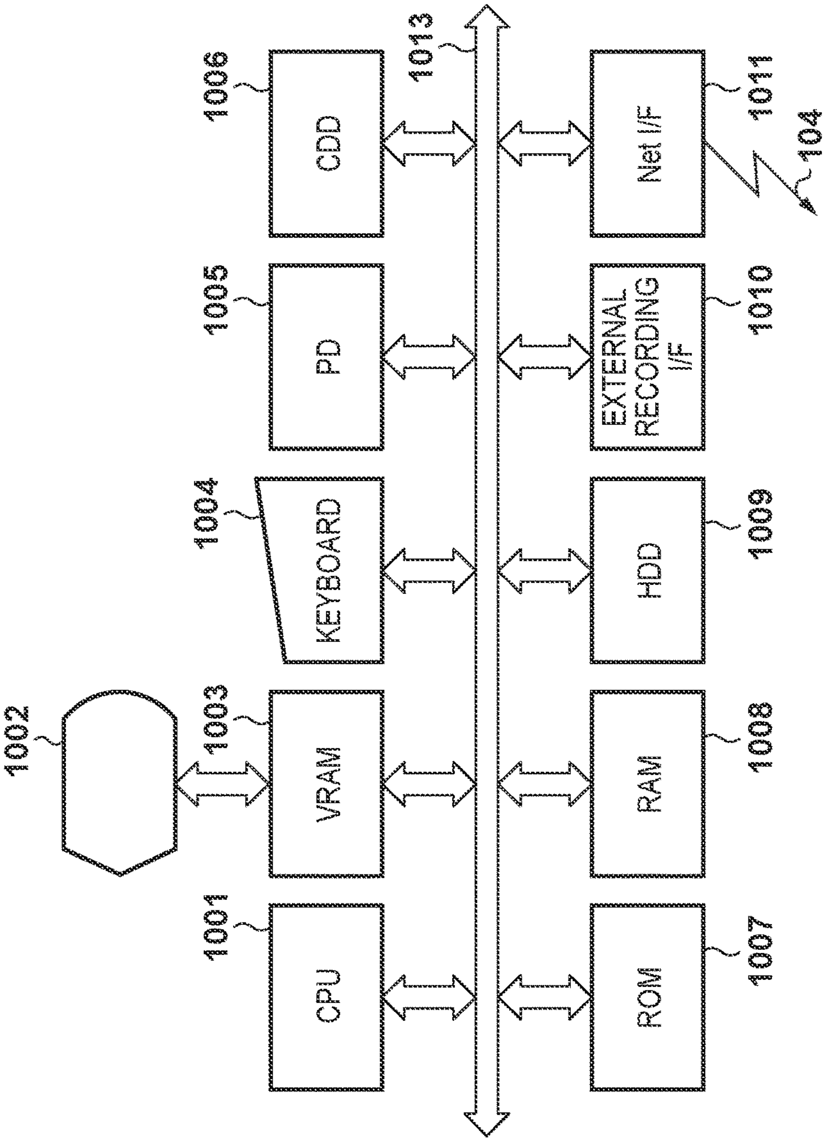
FIG. 10 is a block diagram for showing an example of a hardware configuration of a computer.

Next, an explanation is given using a block diagram of FIG. 10 for a hardware configuration example of a computer that is applicable to the image processing apparatus 102 and the information processing apparatus 103. Below, in order to simplify the explanation, an explanation is given for the image processing apparatus 102 and the information processing apparatus 103 having a configuration shown in FIG. 10; however the image processing apparatus 102 and the information processing apparatus 103 may have differing configurations.

A CPU 1001 performs each process that will be explained later as being performed by the apparatus to which this computer is applied by performing processing using a computer program and data that is stored in a ROM 1007 and a RAM 1008.

A VRAM 1003, as is well known, is a memory for storing screen data that is displayed to a display device 1002, and screens are displayed to a display screen of the display device 1002 according to screen data that is stored to the VRAM 1003.

The display device 1002 is configured by a CRT and a liquid crystal screen, and displays screens according to screen data (stored in the VRAM 1003) for which the results of processing by the CPU 1001 are reflected.

A keyboard 1004 is one example of the user interface operated by a user for performing various instruction input to the computer, and various instructions can be inputted to the CPU 1001 by the user operating the keyboard 1004.

A PD (pointing device) 1005 is one example of a user interface operated by the user for performing various instruction input to the computer. An icon, a menu, or the like, displayed on the display device 1002 can be instructed by the user operating the PD 1005, for example.

A CDD (compact disk drive) 1006 is an apparatus for performing reading/writing of computer programs or data between storage mediums such as a CD-ROM or a CD-R. This may also be a DVD drive. Setting data, a boot program, or the like, of the computer are stored in the ROM 1007.

The RAM 1008 includes an area for storing computer programs or data read from storage medium by the CDD 1006, or computer programs or data loaded from an HDD 1009. Also, the RAM 1008 includes an area for storing a computer program or data received through an external recording interface (external recording I/F) 1010 or a network interface (Net-I/F) 1011. Furthermore, the RAM 1008 includes a work area that is used in a case when the CPU 1001 performs various processing. In other words, the RAM 1008 can provide various areas appropriately.

Computer programs or data for causing the CPU 1001 to execute each process explained later as being performed by an OS (operating system) or the apparatus that the computer is applied to are stored in the HDD 1009. The data and computer programs that are stored in the HDD 1009 are loaded as appropriate into the RAM 1008 in accordance with control by the CPU 1001, and are targets of processing by the CPU 1001.

The external recording interface 1010 is an interface for connecting an external storage medium such as a USB memory to the computer. The network interface 1011 is an interface for connecting the computer to the above described network 104.

A CPU bus 1013 includes an address bus, a data bus and a control bus, and each unit described above is connected to the CPU bus 1013.

Figure 11:
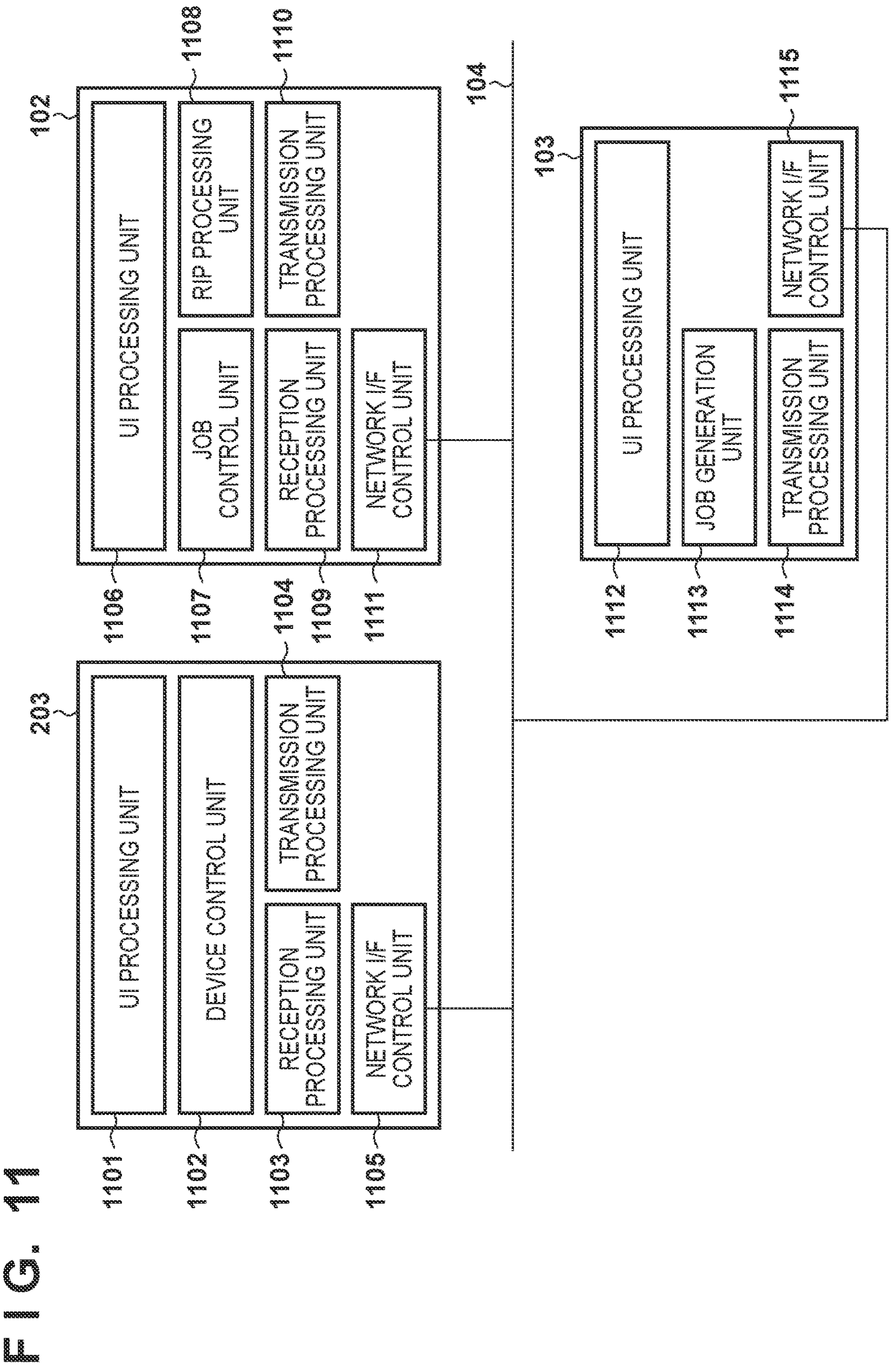
FIG. 11 is a block diagram for showing an example of a software configuration of the image forming system.

Next, a software configuration of each of the image forming apparatus main body 203, the image processing apparatus 102, and the information processing apparatus 103 is explained using a block diagram in FIG. 11. Note that there are cases where functional units shown in FIG. 11 are explained as the subjects of processing in following explanation, but each process that is explained later as being performed by the functional unit is actually performed by the CPU of the apparatus that holds the functional unit executing software corresponding to the functional unit.

A UI processing unit 1101, a device control unit 1102, a reception processing unit 1103, a transmission processing unit 1104, and a network I/F control unit 1105 are software that the CPU 802 in the image forming apparatus main body 203 executes, and the software is stored in the ROM 803, for example.

Also, a UI processing unit 1106, a job control unit 1107, a RIP processing unit 1108, a reception processing unit 1109, a transmission processing unit 1110, and a network I/F control unit 1111 are the software performed by the CPU 1001 in the image processing apparatus 102. This software is saved in the HDD 1009 of the image processing apparatus 102.

Also, a UI processing unit 1112, a job generation unit 1113, a transmission processing unit 1114, and a network I/F control unit 1115 is software executed by the CPU 1001 in the information processing apparatus 103, and the software is saved in the HDD 1009 of the information processing apparatus 103.

Firstly, explanation will be given for software held by the image forming apparatus main body 203. The UI processing unit 1101 controls the operation panel control unit 805, and displays various screens such as a screen for setting the image forming apparatus 101 on the operation panel 425. Then, in a case where the user operates the operation panel 425 and performs various settings, the UI processing unit 1101 saves the content of the settings in the HDD 814, and appropriately reads out the saved setting content from the HDD 814 and displays it on the operation panel 425. In this way, the UI processing unit 1101 performs control to display to the operation panel 425 and various corresponding processes.

The device control unit 1102 controls the CPU circuit unit 801, and the device control unit 1102 executes or controls processing such as image forming by the image forming apparatus 101, post-processing in units of sheets, and a saddle stitch binding forming. Furthermore, the device control unit 1102 reads settings relating printing from the HDD 814, and handles the processing for reflecting these in the printing process.

The reception processing unit 1103 is for receiving various data transmitted to the image forming apparatus main body 203. The reception processing unit 1103 receives print images generated (RIP) by the image processing apparatus 102 through the network I/F control unit 1105, and sends images in units of pages to the device control unit 1102, for example.

The transmission processing unit 1104 transmits various data to external apparatuses. The transmission processing unit 1104 transmits a notification, or the like, that an event or a state change occurred in the image forming apparatus 101 through the network I/F control unit 1105, for example.

The network I/F control unit 1105 controls the network I/F 815. Furthermore, the network I/F control unit 1105 performs processing for data communication between the image forming apparatus main body 203 and the image processing apparatus 102 through the network 104 in cooperation with the network I/F control unit 1111.

Next, explanation will be given for software held by the image processing apparatus 102. The UI processing unit 1106 is for performing various control for displaying to the display device 1002 of the image processing apparatus 102, and causes the display device 1002 to display job settings, states, or the like, when the image forming apparatus 101 and the image processing apparatus 102 perform print jobs, for example.

The job control unit 1107 performs transmission such as a print initiation request of a print job or a setting of a print job to the image forming apparatus 101.

The RIP processing unit 1108 performs RIP processing on the print data included in a print job received from the information processing apparatus 103 in units of pages and generates a print image in units of pages.

The reception processing unit 1109 is for receiving various data transmitted to the apparatus. The reception processing unit 1109 receives events, state changes, or the like from the image forming apparatus main body 203 through the network I/F control unit 1111, and passes these to the UI processing unit 1106 for example. Furthermore, the reception processing unit 1109 passes print jobs received from the information processing apparatus 103 through the network I/F control unit 1111 to the job control unit 1107 or the RIP processing unit 1108.

The transmission processing unit 1110 transmits various data to external apparatuses. The transmission processing unit 1110 passes print images generated by the RIP processing unit 1108 in units of pages to the reception processing unit 1103 of the image forming apparatus main body 203 through the network I/F control unit 1111, for example.

The network I/F control unit 1111 controls the Net-I/F 1011. Furthermore, the network I/F control unit 1111 performs processing for data communication with the image forming apparatus 101, the image processing apparatus 102, and the information processing apparatus 103 in cooperation with the network I/F control unit 1105 and the network I/F control unit 1115, through the network 104.

Next, explanation will be given for software held by the information processing apparatus 103. The UI processing unit 1112 displays a print job setting screen on the display device 1002 of the information processing apparatus 103, and passes an instruction for generating a print job to the job generation unit 1113. The job generation unit 1113 generates a print job in accordance with an instruction from the UI processing unit 1112, and passes the generated print job to the transmission processing unit 1114.

The transmission processing unit 1114 passes a print job generated by the job generation unit 1113 to the reception processing unit 1109 of the image processing apparatus 102 through the network I/F control unit 1115. The network I/F control unit 1115 is for controlling the Net-I/F 1011, and performs processing for data communication between the image processing apparatus 102 and the information processing apparatus 103 through the network 104 in cooperation with the network I/F control unit 1111.

Next, explanation is given for a setting screen displayed on the display device 1002 of the information processing apparatus 103 for setting the print job on the side of the information processing apparatus 103 using FIGS. 12A-12D. Note, both of control for displaying setting screens and saving of content set in the setting screens to the RAM 1008 or the HDD 1009 are performed by the CPU 1001 of the information processing apparatus 103 executing a computer program corresponding to the UI processing unit 1112. This is the same for other types of screens, and is handled by a CPU of that apparatus that displays the screen. Also, an input of an instruction to the setting screen by the user is performed by the keyboard 1004, the PD 1005, or the like. The same is true for other types of screens.

Figure 12A:
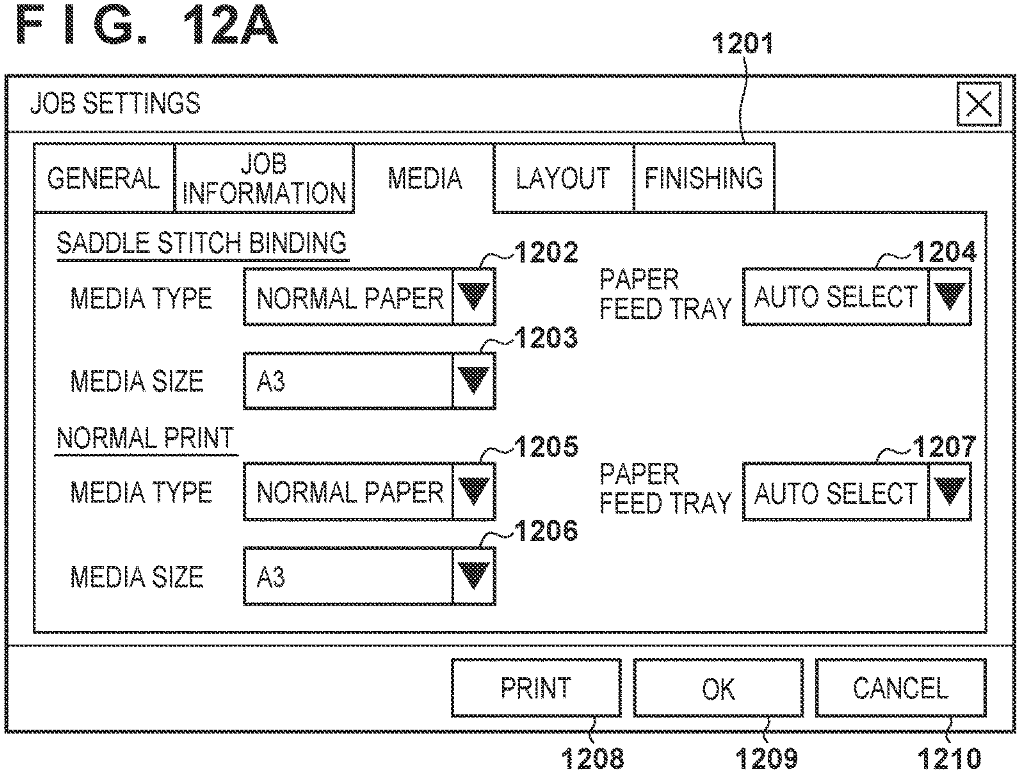
FIG. 12A is a view showing a display example of a setting screen.

As shown in FIG. 12A, the setting screen is providing a tag 1201 where the job setting items are grouped by the type, and the tag 1201 is comprised of 5 types: "general", "job information", "media", "layout", and "finishing". In a case where the user is instructing a "media" tag by operating the keyboard 1004, the PD 1005, or the like, a "media" setting item is displayed as shown in FIG. 12A.

A "media" tag is a tag where settings associated with the printing medium (media) used for the print job are collected. A media type setting 1202, a media size setting 1203, and a paper feed tray setting 1204 are the setting items relating to a printing medium used for the saddle stitch binding.

Normal paper is selected as the media type setting 1202, A3 is selected as the media size setting 1203, and automatic selection is selected as the paper feed tray setting 1204 in FIG. 12A. That is, in the settings of FIG. 12A, setting is performed so that feeding and printing are performed using any given paper feed tray if the media type of the paper feed tray is normal paper and the media size of the paper feed tray is set to A3.

A media type setting 1205, a media size setting 1206, and a paper feed tray setting 1207 are the setting items relating to a printing medium used in a case where the saddle stitch binding is not performed. Normal paper is selected as the media type setting 1205, A3 is selected as the media size setting 1206, and automatic selection is selected as the paper feed tray setting 1207 in FIG. 12A. That is, in the settings of FIG. 12A, setting is performed so that feeding and printing are performed using any given paper feed tray if the media type of the paper feed tray is normal paper and the media size of the paper feed tray is set to A3.

In a case where a print button 1208 is instructed, the CPU 1001 of the information processing apparatus 103 transmits the print job including the content set in the setting screen to the image processing apparatus 102.

Also, in a case where an OK button 1209 is instructed, the CPU 1001 of the information processing apparatus 103 saves the content set in the setting screen in the HDD 1009. Also, in a case where a cancel button 1210 is instructed, the CPU 1001 of the information processing apparatus 103 discards the content set in the setting screen.

Also, in a case where "layout" is instructed from the 5 types tags described above, as shown in FIG. 12B, "layout" setting items are displayed.

"layout" is a tag where settings relating to print layout are collected. A print method setting 1211 and a binding direction setting 1212 are the setting items relating to a layout of a saddle stitch binding. Double-sided printing is selected for the print method setting 1211, and the shorter side binding is selected for the binding direction setting 1212 in FIG. 12B. That is, in the settings of FIG. 12B, setting is performed so that double-sided printing with shorter side binding of 2 pages of A3 size image data is performed as the layout of the saddle stitch binding.

A print method setting 1213 and a binding direction setting 1214 are the setting items relating to a layout for when saddle stitch binding is not performed. Single-sided printing is selected for the print method setting 1213, and "none" is selected for the binding direction setting 1214 in FIG. 12B. That is, in the setting of FIG. 12B, setting is performed so single-sided printing of 1 page of image data is performed as the layout in a case where the saddle stitch binding is not performed. The explanation of the print button 1208, the OK button 1209, and the cancel button 1210 are the same as the explanation in FIG. 12A, so the explanation will be omitted.

Also, in a case where "finishing" is instructed from the 5 types of tags described above, as shown in FIG. 12C, the setting item of "finishing" is displayed.

"finishing" is a tag where settings relating to paper discharging or forming are collected. A discharge destination setting 1215 is a setting relating to a paper discharge destination designation, and saddle stack is designated in FIG. 12C. Here, in addition to saddle stack, the sample tray 711 of the finisher apparatus 206 and the sample tray 714 are selectable for this setting.

A punch setting 1216 is an item for setting whether or not the punch process is performed on the printing medium when evacuation to the finisher apparatus 206 is performed. "do not perform" is designated for the punch setting 1216 in FIG. 12C.

The staple setting 1217 is an item for setting whether or not to perform the processing for stapling printing mediums when evacuating to the finisher apparatus 206. "do not perform" is designated for the staple setting 1217 in FIG. 12C.

A saddle stitch binding setting 1218 is an item for setting whether or not saddle stitching processing is performed on the printing medium when evacuation to the finisher apparatus 206 is performed. "perform" is set for the saddle stitch binding setting 1218 in FIG. 12C.

A sheet processing settings button 1219 is a button for instructing to set the setting content for when performing post-processing in the post-processing device 205. In a case where the sheet processing settings button 1219 is instructed, the CPU 1001 of the information processing apparatus 103 displays the sheet processing setting screen in FIG. 12D on the display device 1002. Note that the explanation of the print button 1208, the OK button 1209, and the cancel button 1210 are the same as the explanation in FIG. 12A, so the explanation will be omitted.

Figure 12B:
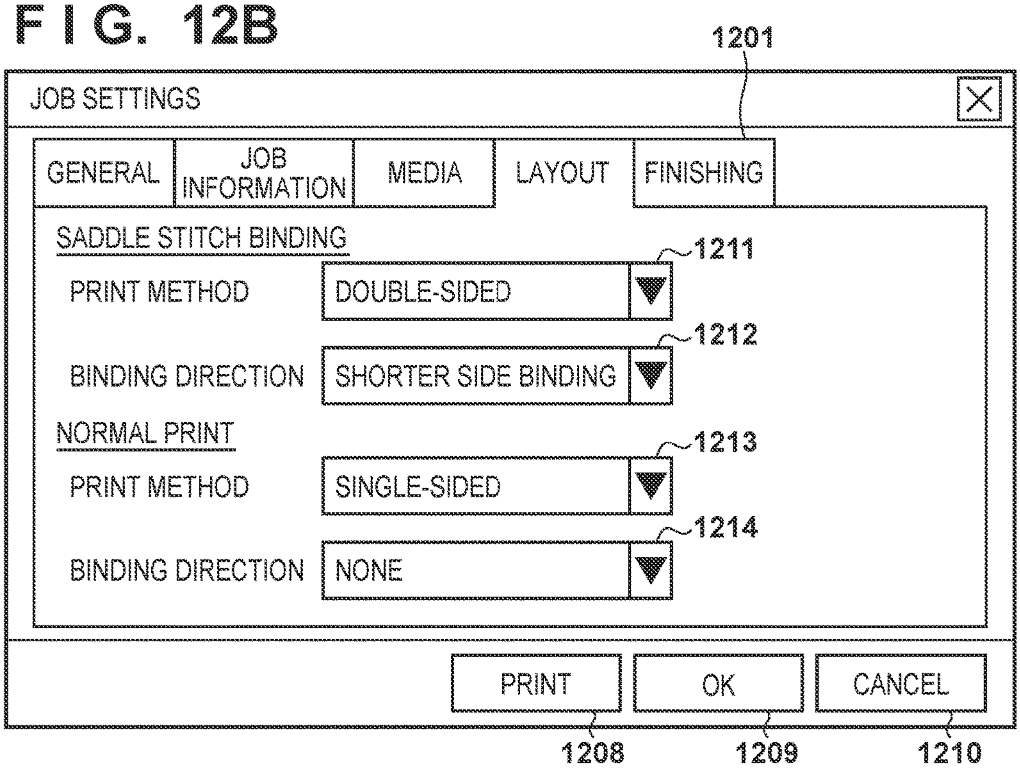
FIG. 12B is a view showing a display example of a setting screen.
Figure 12C:
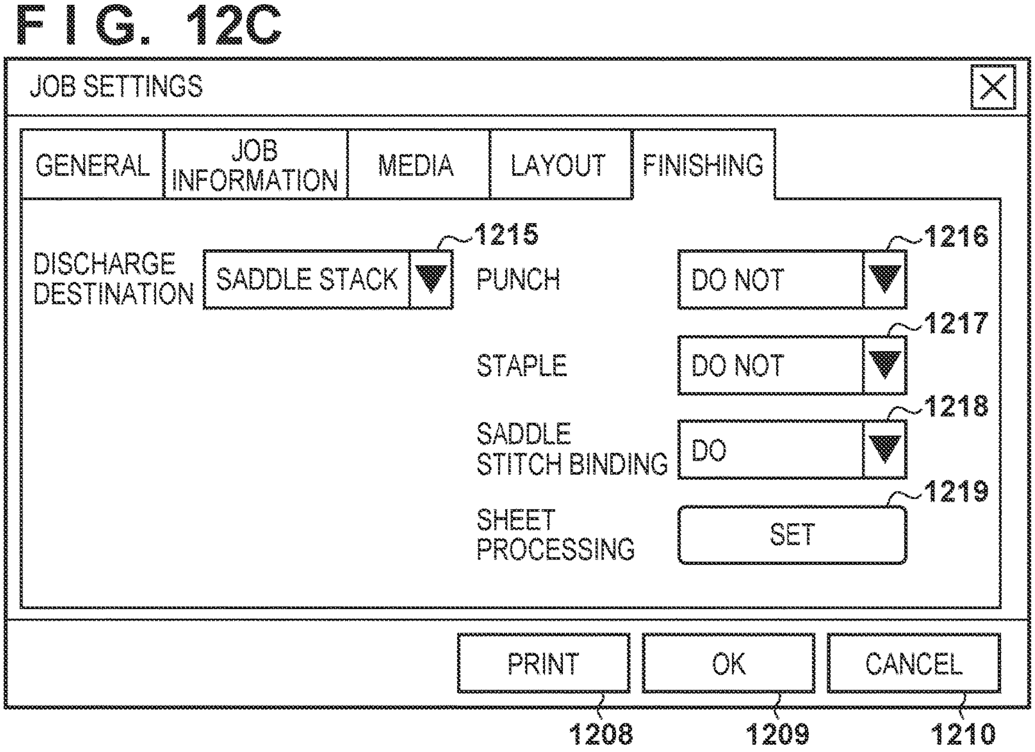
FIG. 12C is a view showing a display example of a setting screen.
Figure 12D:
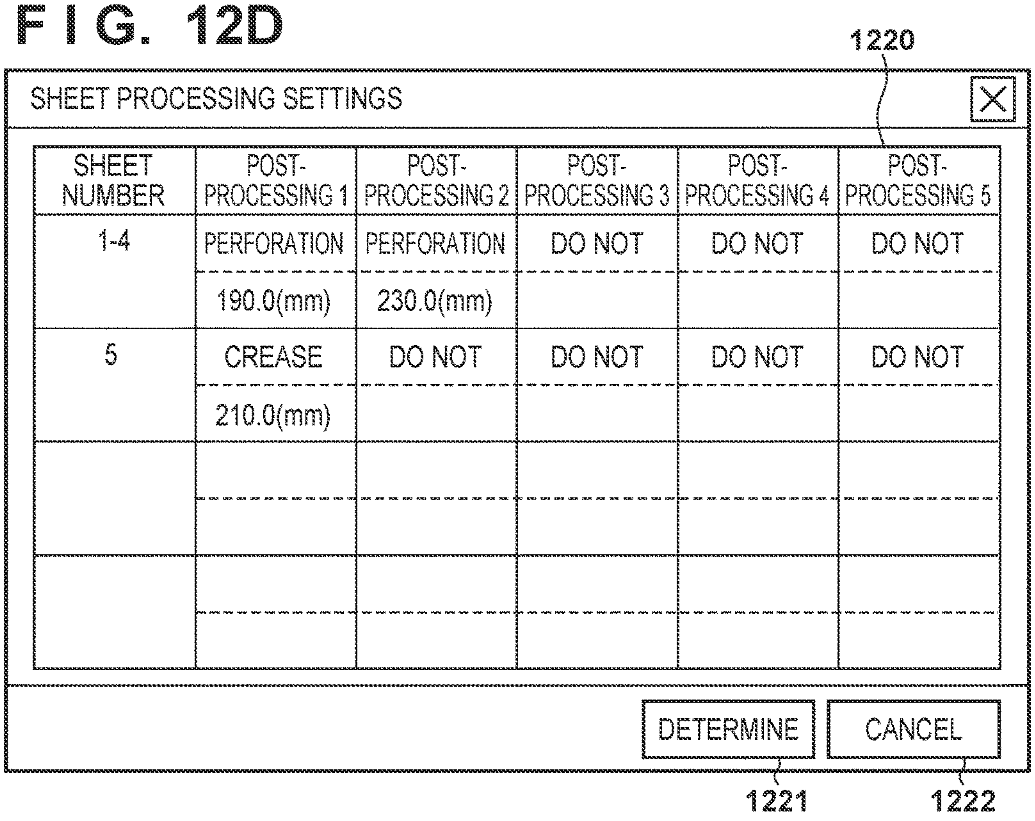
FIG. 12D is a view showing a display example of a setting screen.

In FIG. 12D, the setting items for the post-processing performed by the post-processing device 205 is displayed in a list in an area 1220, and the setting items are comprised of "sheet number", "post-processing 1", "post-processing 2", "post-processing 3", "post-processing 4", and "post-processing 5".

"sheet number" is an item for designating the number of sheets to which to apply the post-processing, and an integer of one or more can be set. Here, "sheet number" is something that represents by a number a sheet order by which the image forming apparatus main body 203 discharges sheet to the outside of the device.

"post-processing 1", "post-processing 2", "post-processing 3", "post-processing 4", and "post-processing 5" are the items for setting the type of the post-processing applied to the sheet and the position from the leading edge of the sheet. In FIG. 12D, a maximum of 5 types can be set as types of post-processing for one sheet group (a group whose sheet number is from 1 to 4 or a group whose sheet number is 5 in FIG. 12D), but the number is not limited to 5 and any number may be used.

The settings exemplified in FIG. 12D are settings relating to formation of an A3 size saddle stitch binding comprising of 5 sheets. A sheet group (sheets from the first page to the fourth page) corresponding to the sheet numbers 1-4 is a sheet group corresponding to the body of the saddle stitch binding, and 2 perforations are set to be applied at the positions of 190.0 [mm] and 230.0 [mm].

Also, a sheet corresponding to the sheet number 5 (the sheet of the fifth page) is a sheet corresponding to the cover of the saddle stitch binding, and 1 creasing is set to be applied at the position of 210.0 [mm].

Note, because the longer side of the A3 size is 420.0 [mm], it is envisioned that with the above described settings the creasing is performed at the middle to the cover of the saddle stitch binding, and the perforation is formed at the position of 20.0 [mm] from the middle for the body.

Then, in a case where a determination button 1221 is instructed, the CPU 1001 of the information processing apparatus 103 saves the content set in the sheet processing setting screen in the HDD 1009. On the other hand, in a case where a cancel button 1222 is instructed, the CPU 1001 of the information processing apparatus 103 discards the content set in the sheet processing setting screen.

Figure 13A:
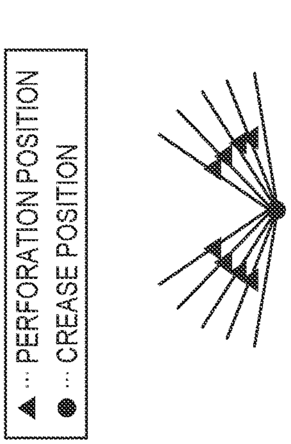
FIGS. 13A-13D are views for explaining a saddle stitch binding.
Figure 13B:
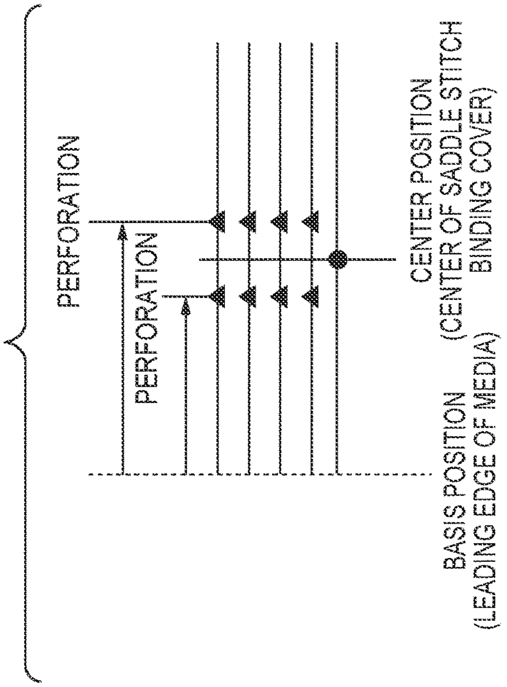
Figure 13C:
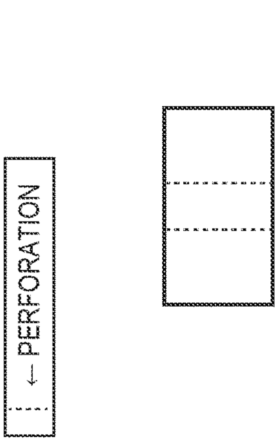
Figure 13D:
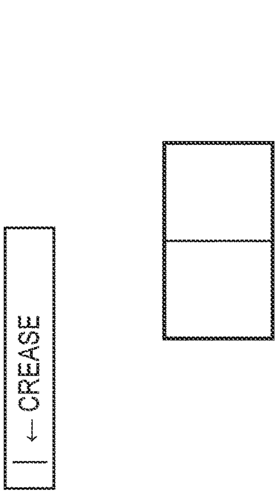

Explanation will be given for a saddle stitch binding generated by the settings in FIG. 12A, FIG. 12B, FIG. 12C, and FIG. 12D using FIGS. 13A-13D. FIG. 13A represents a formed saddle stitch binding, and it is comprised of 5 sheets in the A3 size. FIG. 13B shows a breakdown of the saddle stitch binding in FIG. 13A in units of sheets. It is shown that the cover sheet is processed the creasing on a central portion, and perforation processing is performed on each of the body sheets at a position of 20.0 [mm] away from the central portion. FIG. 13C is a view of the body of the saddle stitch binding from the perspective of the upper side, and it is shown that 2 perforations are cut on the sheet in the A3 size. FIG. 13D is a view of the cover of the saddle stitch binding from the perspective of the upper side, and it is shown that 1 creasing is made on the sheet in the A3 size. That is, 4 sheets to which the perforation processing is applied at two places, and 1 sheet to which the creasing processing is applied at one place are generated as the body and the cover respectively.

First Embodiment

In the present embodiment, explanation will be given for a case where the perforation and the creasing processing is performed by the post-processing device 205 in a case where the information processing apparatus 103 transmits the saddle stitch binding job comprised of 5 sheets to the image processing apparatus 102. It is assumed that the user performs setting of the print job as shown in FIGS. 12A-12D for this.

Then, after the user performs the setting as shown in FIGS. 12A-12D and instructs the print button 1208, the UI processing unit 1112 makes a request for the generation of the print job to the job generation unit 1113, and the job generation unit 1113 generates the saddle stitch binding job. The saddle stitch binding job includes the print data from the first page to the fifth page and the content set in the setting screen in FIGS. 12A-12D. The job generation unit 1113 sends the saddle stitch binding job to the transmission processing unit 1114, and the transmission processing unit 1114 transmits the saddle stitch binding job to the image processing apparatus 102 using the network I/F control unit 1115. Explanation is given for the processing performed by the image processing apparatus 102 receiving the saddle stitch binding job using a flowchart in FIG. 14.

In a case where the saddle stitch binding job is received by the network I/F control unit 1111 and the reception processing unit 1109, the processing proceeds to step S1402 via step S1401, and in a case where the saddle stitch binding job is not received yet, the processing stands by in step S1401.

In step S1402, the job control unit 1107 reads and analyzes the setting content included in the saddle stitch binding job, in other words the content set in the setting screen in FIGS. 12A-12D.

In step S1403, the job control unit 1107 generates the information including the content set in the setting screen in FIG. 12A and the content set in the setting screen in FIG. 12B as configuration information. Also, the job control unit 1107 generates information including the content set in the setting screen in FIG. 12C and the content set in the setting screen in FIG. 12D as finishing information.

In step S1404, the job control unit 1107 controls the transmission processing unit 1110 to transmit a print initiation request, the configuration information generated in step S1403, and finishing information to the image forming apparatus main body 203.

In step S1405, the job control unit 1107 controls the RIP processing unit 1108 to generate a print image of a first page-a fifth page based on print data for the first page-fifth page included in the saddle stitch binding job. Then the job control unit 1107 controls the transmission processing unit 1110, and transmits print images of the first page-fifth page to the image forming apparatus main body 203.

Figure 14:
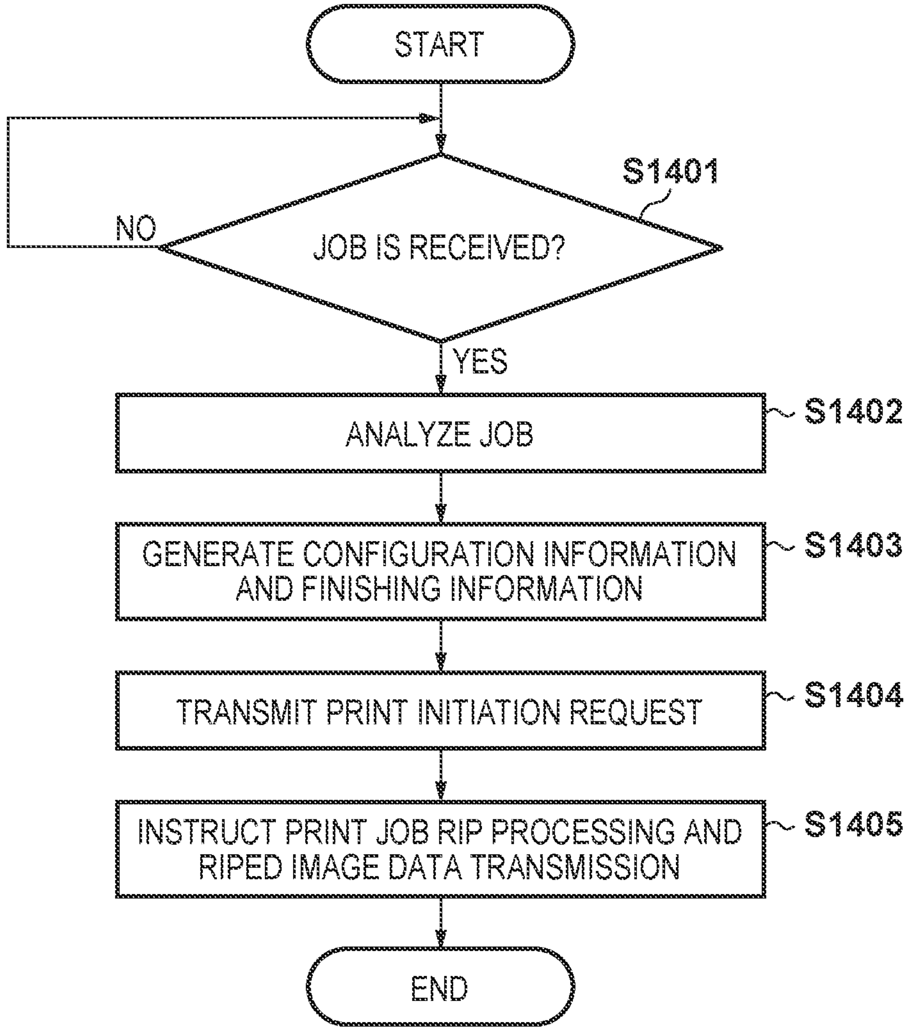
FIG. 14 is a flowchart of a process performed by an image processing apparatus 102.

Additionally, in FIG. 14, a print initiation request, configuration information, as well as finishing information and print images are transmitted individually, but a configuration may be taken to collect these into a single print job and transmit them.

Figure 15A:
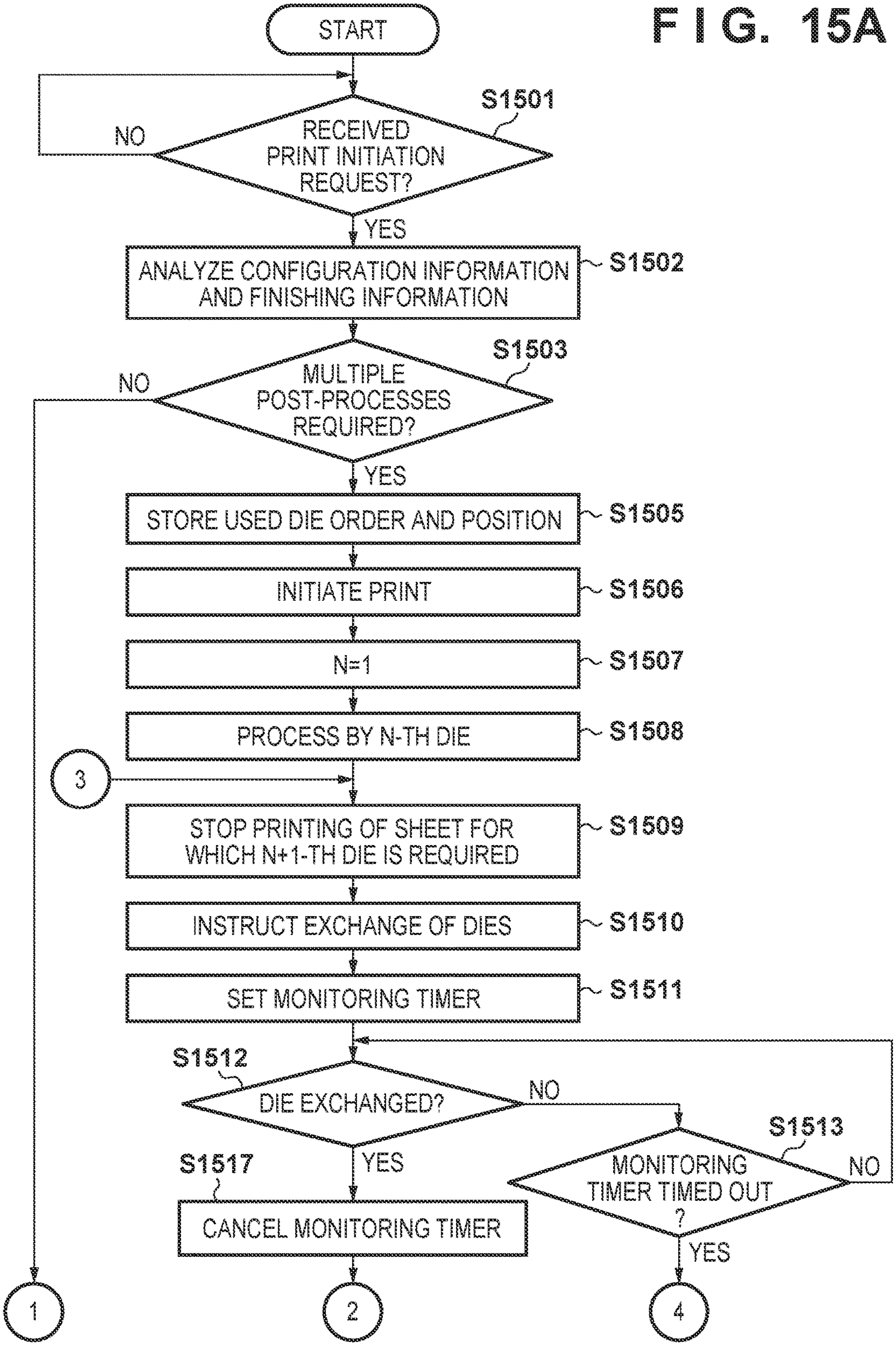
FIG. 15A is a flowchart of a process performed by the image forming apparatus main body 203.
Figure 15B:
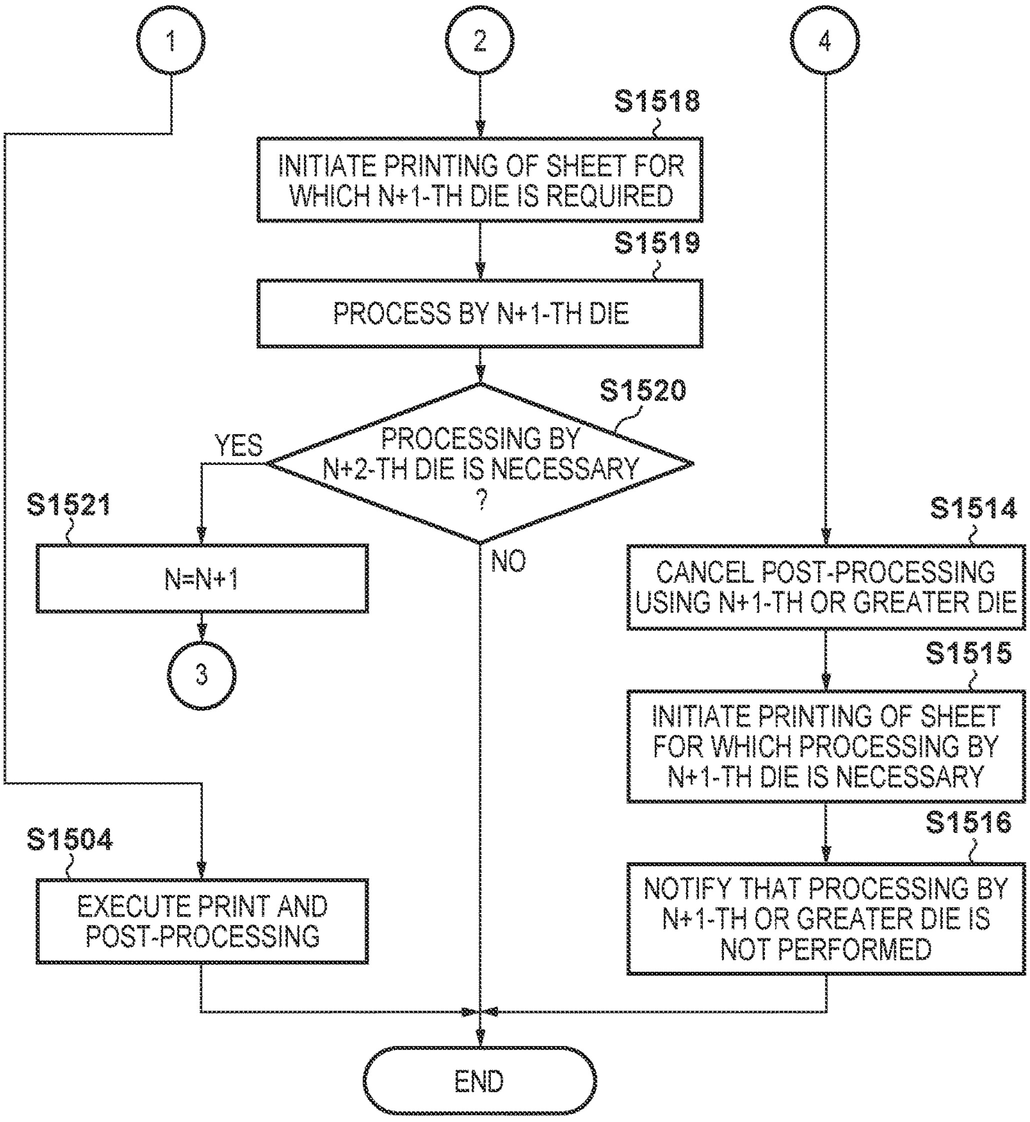
FIG. 15B is a flowchart of a process performed by the image forming apparatus main body 203.

Next, concerning the processing the image forming apparatus main body 203 performs, an explanation will be given using FIG. 15A and FIG. 15B.

In a case when receiving a print initiation request from the image processing apparatus 102 by the network I/F control unit 1105 and the reception processing unit 1103, the processing proceeds to step S1502 through step S1501. On the other hand, in a case when a print initiation request is not received, the processing waits in step S1501.

In step S1502, the device control unit 1102 analyzes the configuration information and the finishing information received from the image processing apparatus 102.

In step S1503, the device control unit 1102 determines whether or not 2 or more types of post-processing are registered for the finishing information. In a case when it is determined that the result of this determination is that 2 or more types are registered, the processing proceeds to step S1505, and when it is determined that two or more types are not registered (only one type of post-processing is registered for the finishing information), the processing proceeds to step S1504. In the case of FIG. 12D, since there are two types of post-processing (perforation and creasing) which are registered for the finishing information, in such a case the processing proceeds to step S1505.

In step S1504, the device control unit 1102 uses the configuration information and the finishing information, and performs control processing for the above described print processing and post-processing. In other words, the first page-fifth page print images that are received from the image processing apparatus 102 are each printed on printing mediums, and in addition the printed printing mediums being sent to an apparatus such as the inserter apparatus 204, or the like, which is downstream, a downstream apparatus is caused to execute the post-processing.

On the other hand, in step S1505, the device control unit 1102 uses analyzed finishing information, and finalizes an order of the die for post-processing 604 that the post-processing device 205 uses, as well as position information by which post-processing is applied in units of sheets. Additionally, the finalized information is stored to the RAM 804 of the image forming apparatus main body 203 as post-processing information.

For example, in a case when setting is performed as in FIG. 12D, it is stored that first post-processing is applied to positions that are 190.0 [mm] and 230.0 [mm] from a leading edge of the sheet using the perforation die for the first-fourth sheets. Additionally, for the fifth sheet, it is stored that a creasing die is used secondly to apply post-processing at a position that is 210.0 [mm] from a leading edge of the sheet.

Next, in step S1506, the device control unit 1102 uses configuration information and finishing information to initiate printing consecutively print images of the first page-the fifth page that are received from the image processing apparatus 102, starting from the print image of the first page.

In step S1507, the device control unit 1102 initializes a variable N to 1 using the following processing.

In step S1508 the device control unit 1102 identifies the N-th die used from post-processing information that is managed by the RAM 804. In a case as in the above example, when N=1, the N-th used die is specified as the perforation die. Also, when N=2, the N-th used die is specified as the creasing die.

Then the device control unit 1102 makes an instruction to the post-processing device 205 (the CPU 902) to cause it to perform post-processing using the identified die. For example, in the example that is described above, in a case when N=1, an instruction is made such that the perforation is applied by for the first die, which is the perforation die, at positions that are 190.0 [mm] and 230.0 [mm] from a leading edge of the sheet for the first-fourth sheets.

Next, in step S1509, the device control unit 1102 refers to the finishing information, and continues this printing until printing of a sheet for which post-processing is performed using an N-th die is completed. Then the device control unit 1102 refers to the finishing information, and in a case when a sheet of the next page to the sheet being currently printed is a sheet which requires post-processing that uses an (N+1)-th die, at a point in time when printing of the sheet currently being printed is completed, print processing is caused to be suspended. When this step is completed, printing of the sheet that requires post-processing which uses the N-th die is completed, and printing of the sheet that requires post-processing which uses the (N+1)-th or later die stands by. For example, as an example of the foregoing, in a case when N=1, an instruction is given to stop feeding of sheets for which post-processing that uses the second die is performed. In the present embodiment, the device control unit 1102 instructs, to not feed a fifth sheet on which post-processing is performed using the creasing die, which is the second die.

In step S1510 the device control unit 1102 makes the following instruction to the UI processing unit 1101. In other words, an instruction is performed such that a message window is caused to be displayed to the operation panel 425 in order to notify a user so that the user exchanges a die (N-th die) that is currently attached to the post-processing device 205 with an (N+1)-th die. As a result, this kind of a message window will be displayed on the display screen of the operation panel 425.

Figure 16A:
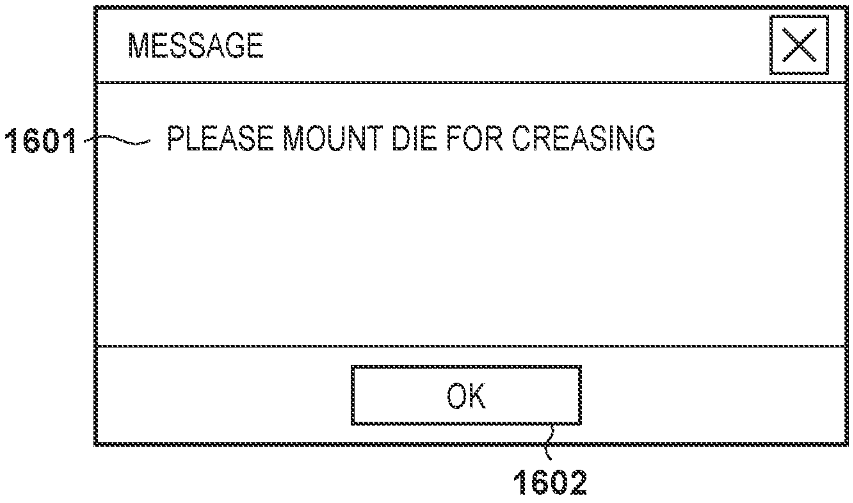
FIGS. 16A and 16B are views for illustrating examples of a message window.

An example of this kind of a message window is shown in FIG. 16A. In FIG. 16A a message window is shown in which a message 1601 for notifying the user so that the user exchanges the (N+1)-th die with the creasing die is recited.

Once the user confirms this kind of message window, the die that is currently mounted to the post-processing device 205 is exchanged with the die for which the notification is made in the message window. Then after the exchange, the user instructs an OK button 1602. When the OK button 1602 is instructed, the UI processing unit 1101 deletes this message window, and the processing proceeds to step S1511.

In step S1511 the device control unit 1102 uses a timer function that the CPU 802 comprises, and starts timekeeping (sets a monitoring timer). Then, in a case where after the start of the timekeeping, the device control unit 1102 receives a notification from the post-processing device 205 to the effect that the die was exchanged with an (N+1)-th die, the processing proceeds to step S1517 through step S1512. On the other hand, in a case when such a notification is not received, the processing proceeds to step S1513 through step S1512.

In the post-processing device 205, the die detection unit 905 is able to perform detection of whether or not a die is currently set to the post-processing device 205, and the die detection unit 905 is able to recognize the type of die that is currently set, and the CPU 902 of the post-processing device 205 is notified of the result of this detection/recognition. The CPU 902 notifies the CPU 802 of the image forming apparatus main body 203 of the content that it was notified of. On the image forming apparatus main body 203 side, it can be recognized whether or not a die is currently set to the post-processing device 205, and what type of die is currently set.

In the case of the present embodiment, when it is determined whether or not the die that is currently set to the post-processing device 205 is the creasing die, which is the second die, and it is determined that it is the creasing die that is the second die, it is determined to be exchanged, and the processing proceeds to step S1517.

In step S1513, the device control unit 1102 determines whether or not a predetermined time has elapsed (times out) from when the timekeeping was initiated in step S1511. In a case when the result of this determination is that the predetermined time has elapsed, it is determined that the die was not exchanged with the desired die within the predetermined time, and the processing proceeds to step S1514. On the other hand, when the predetermined time has not elapsed yet, the processing proceeds to step S1512.

In step S1514, the device control unit 1102 instructs the post-processing device 205 to hereinafter cancel post-processing. In other words, an instruction is given to cancel post-processing that uses an (N+1)-th or greater die. For example, in the above-described example, when N=1, an instruction is performed to cancel post-processing that uses a die that is after the second die. In the present embodiment, the device control unit 1102 instructs to cancel post-processing that uses a creasing die, which is the second die.

In step S1515, the device control unit 1102, performs printing of a print image of a page (subsequent page) requiring post-processing that uses an (N+1)-th die, or in other words, the printing suspended in step S1509 as described above. For example, in the above example, when N=1, printing of a sheet that requires post-processing that uses the second die is started. In the present embodiment, printing of a sheet that requires post-processing that uses the creasing die, which is the second die, is started.

In step S1516, the device control unit 1102 instructs the UI processing unit 1101 to display to the operation panel 425 a message window that recites a message to the effect that since an exchange of a die was not performed, post-processing has been cancelled, although print processing will be performed. As a result, this kind of a message window will be displayed on the display screen of the operation panel 425.

Figure 16B:
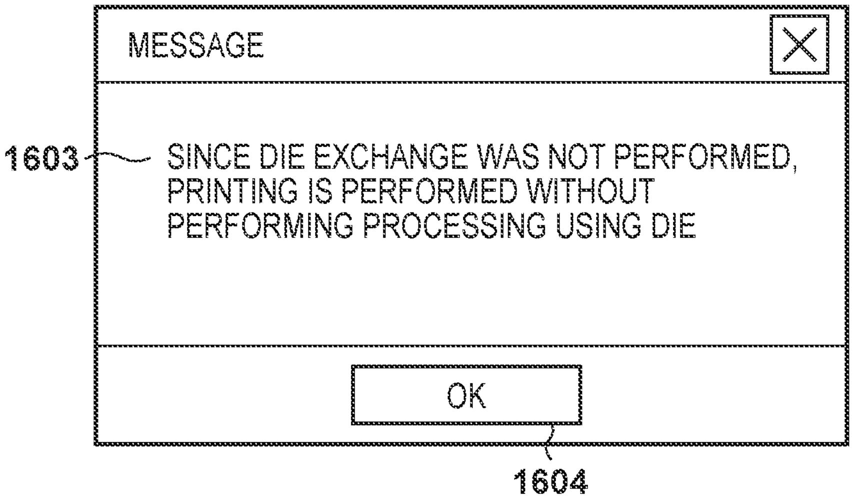

An example of this kind of a message window is shown in FIG. 16B. In FIG. 16B the message window shows a message 1603 that recites something to the effect of since an exchange of a die was not performed, post-processing has been cancelled, although print processing will be performed.

When the user confirms such a message window, the user instructs an OK button 1604. When the OK button 1604 is instructed, the UI processing unit 1101 deletes the message window, and completes the processing according to the flowchart of FIG. 15B.

On the other hand, in step S1517 the device control unit 1102 ends timekeeping that was initiated in step S1511.

In step S1518, the device control unit 1102 uses configuration information and finishing information to perform printing of a print image of a page requiring post-processing that uses the (N+1)-th die, or in other words, the printing suspended in step S1509 described above. For example, as an example of the foregoing, in a case when N=1, an instruction is given to feed sheets for which post-processing that uses the second die is performed. In the present embodiment, the device control unit 1102 instructs such that the sheet that uses a second die that is a creasing die, which is the fifth sheet, is printed.

In step S1519 the device control unit 1102 identifies the (N+1)-th die used from post-processing information that is managed by the RAM 804. Then the device control unit 1102 makes an instruction to the post-processing device 205 to cause it to perform post-processing using the identified die. For example, in the example above, when N=1, an instruction is made to perform post-processing that uses the second die. In the present embodiment, an instruction is made to apply to the fifth sheet creasing at a position that is 210.0 [mm] from a leading edge of the sheet, using the perforation die which is the second die.

In step S1520, the device control unit 1102 determines whether or not post-processing that uses the (N+2)-th die is registered in post-processing information. In a case when the result of this determination is that post-processing that uses the (N+2)-th die is registered, the processing proceeds to step S1521, and in a case when it is not registered, the processing according to the flowchart of FIG. 15B is completed.

For example, in the above example, when N=1, it is determined whether or not performance of post-processing that uses the third die is required. In the present embodiment, since there is no process that uses the third die, processing ends. In step S1521, the device control unit 1102 increments a value of a variable N by 1. Then the processing returns to step S1509.

Additionally, in the present embodiment, the following configuration is merely one example of an image forming apparatus for which exchange of die is possible. In other words, when after printing a page for which post-processing that uses the first die mounted to an image forming apparatus is set, the next page is a page that requires post-processing that uses a second die that is different from the first die, print operation is interrupted. Furthermore, a user is notified so that the user exchanges the first die that is mounted to the image forming apparatus with the second die.

Second Embodiment

First, an explanation will be given for "single pass mode" and "multiple pass mode" which are terms used in the present embodiment. A single pass mode, is an operation mode of the image forming system in the first embodiment, and it is a mode for prompting a user to exchange the die each time it is determined that exchange of a die is required. On the other hand, a multiple pass mode refers to a mode in which even if it is determined that an exchange of die is necessary, if there exists a page in the subsequent pages that requires post-processing that uses the die that is currently mounted to the post-processing device 205, post-processing of that page is performed. Then post-processing is performed for the remaining pages after the exchange of the die.

An advantage to using these two modes separately is described below. A case of forming 10 units for the saddle stitch binding job explained in the first embodiment is considered, for example. When a single pass mode is used, in order to consecutively print 10 units, it is necessary to switch a die for perforation and a creasing die 19 times. On the other hand, when using the multiple pass mode, printing and processing is performed with the die for perforation in a first pass, and processing is performed with the creasing die during a second pass. For this reason, exchanging of the die needs only be performed once.

In the present embodiment, upon formation of a printed material, by using the two modes described above separately, the number of times that the die for post-processing 604 is exchanged is minimized, and work efficiency of a user is further improved. Hereinafter, an explanation of the present embodiment will be given using the following concrete examples.

In the present embodiment, just as in the first embodiment, perforation and creasing is performed in a saddle stitch binding job that is comprised of 5 sheets. Firstly, as settings for a saddle stitch binding job that are transmitted from the information processing apparatus 103, the settings of FIGS. 12A-12D are applied. In addition, in the present embodiment, it is assumed that the number of print copies can be set in a screen (not shown) for setting job information of the tag 1201 which groups by the type of job setting items. Then in the present embodiment, a case when the number of print copies is 1 copy and a case of when the number of copies are multiple copies is considered.

After the user performs the setting as shown in FIGS. 12A-12D and instructs the print button 1208, the UI processing unit 1112 makes a request for the generation of the print job to the job generation unit 1113, and the job generation unit 1113 generates the saddle stitch binding job. The saddle stitch binding job includes the print data from the first page to the fifth page and the content set in the setting screen in FIGS. 12A-12D. The job generation unit 1113 sends the saddle stitch binding job to the transmission processing unit 1114, and the transmission processing unit 1114 transmits the saddle stitch binding job to the image processing apparatus 102 using the network I/F control unit 1115. Concerning the processing that is performed by the image processing apparatus 102, which received the saddle stitch binding job, since the process is in accordance with the flowchart of FIG. 14 similarly to in the first embodiment, a corresponding explanation will be omitted.

Figure 17A:
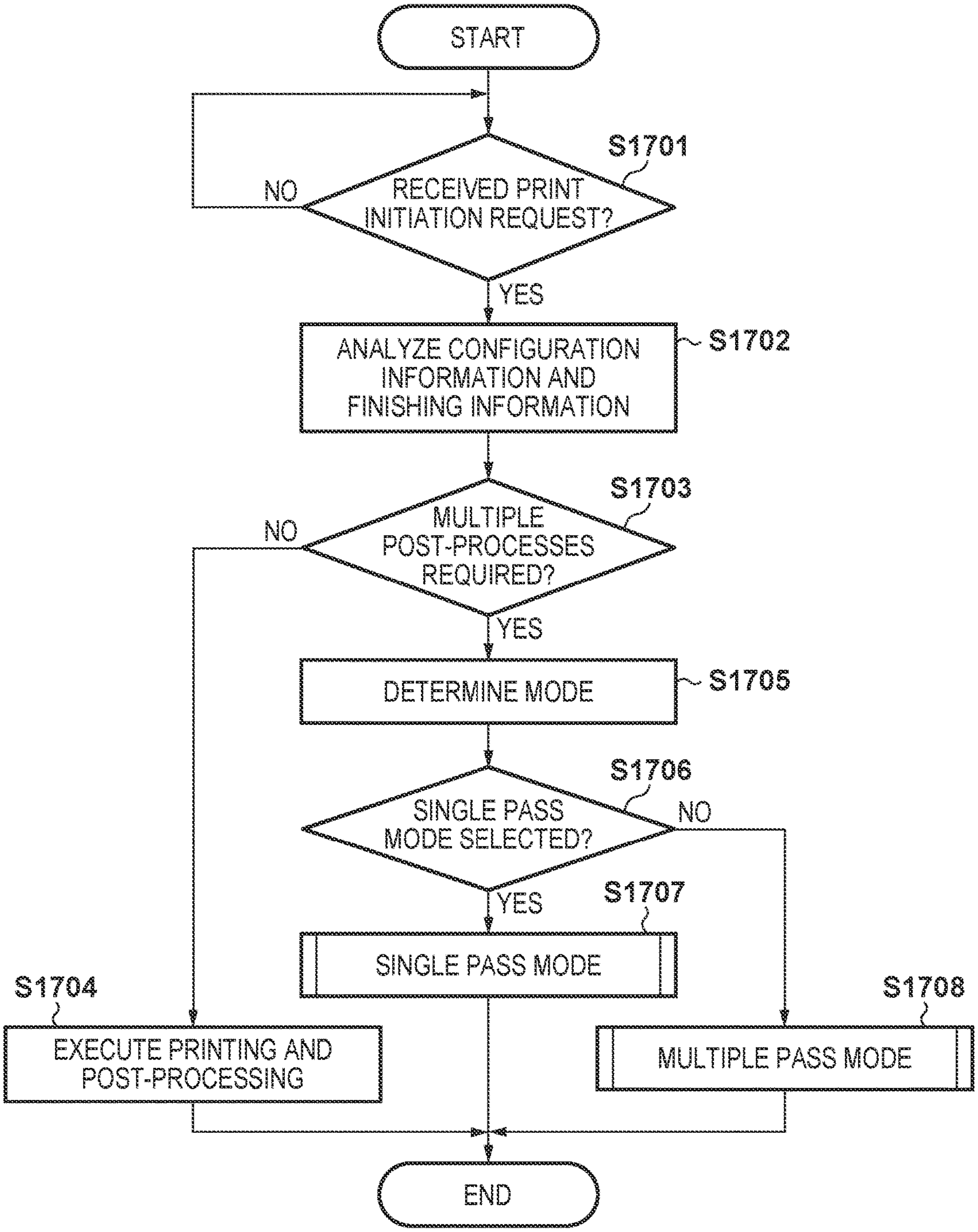
FIG. 17A is a flowchart of a process performed by the image forming apparatus main body 203.
Figure 17B:
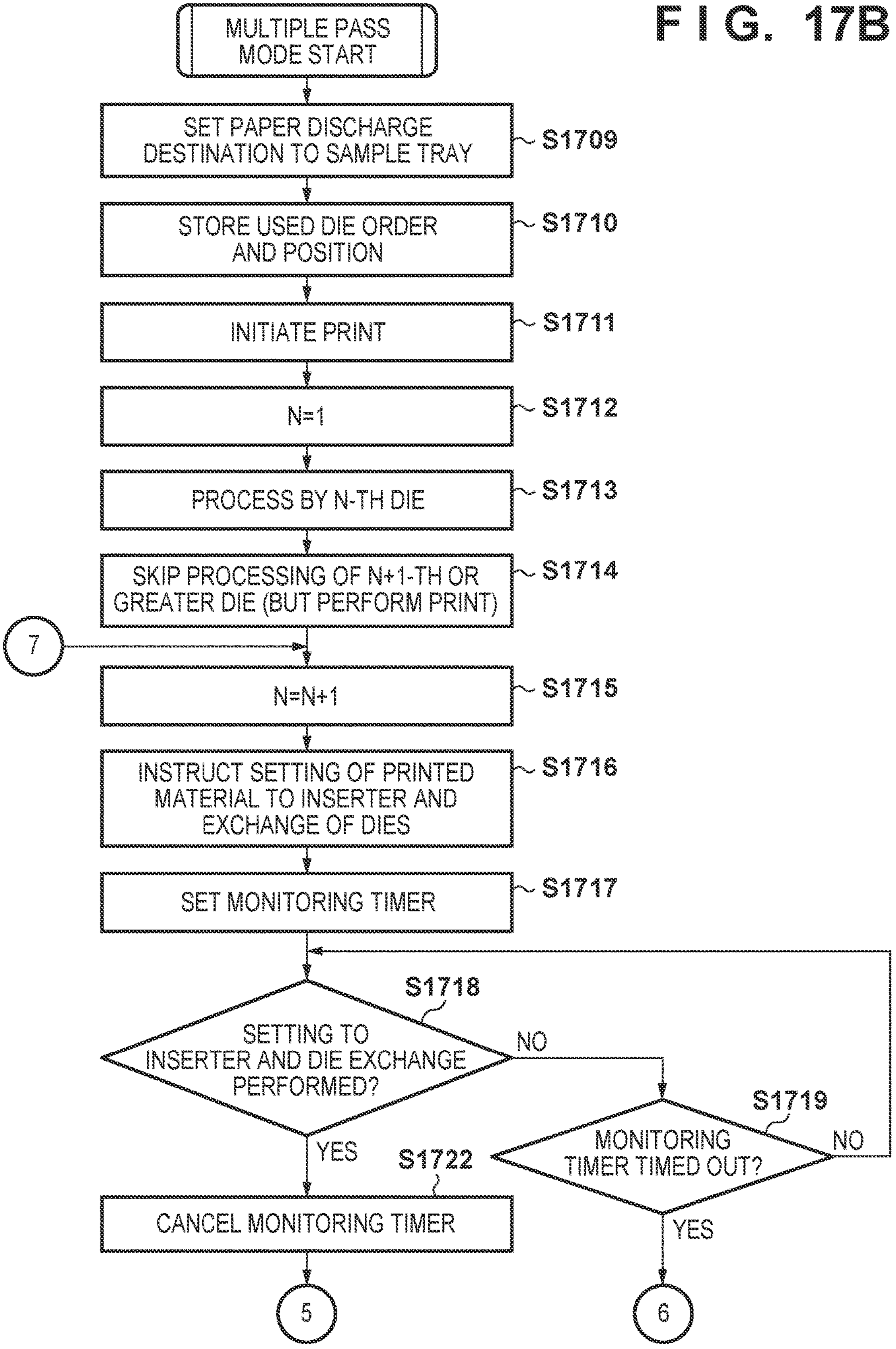
FIG. 17B is a flowchart of a process performed by the image forming apparatus main body 203.
Figure 17C:
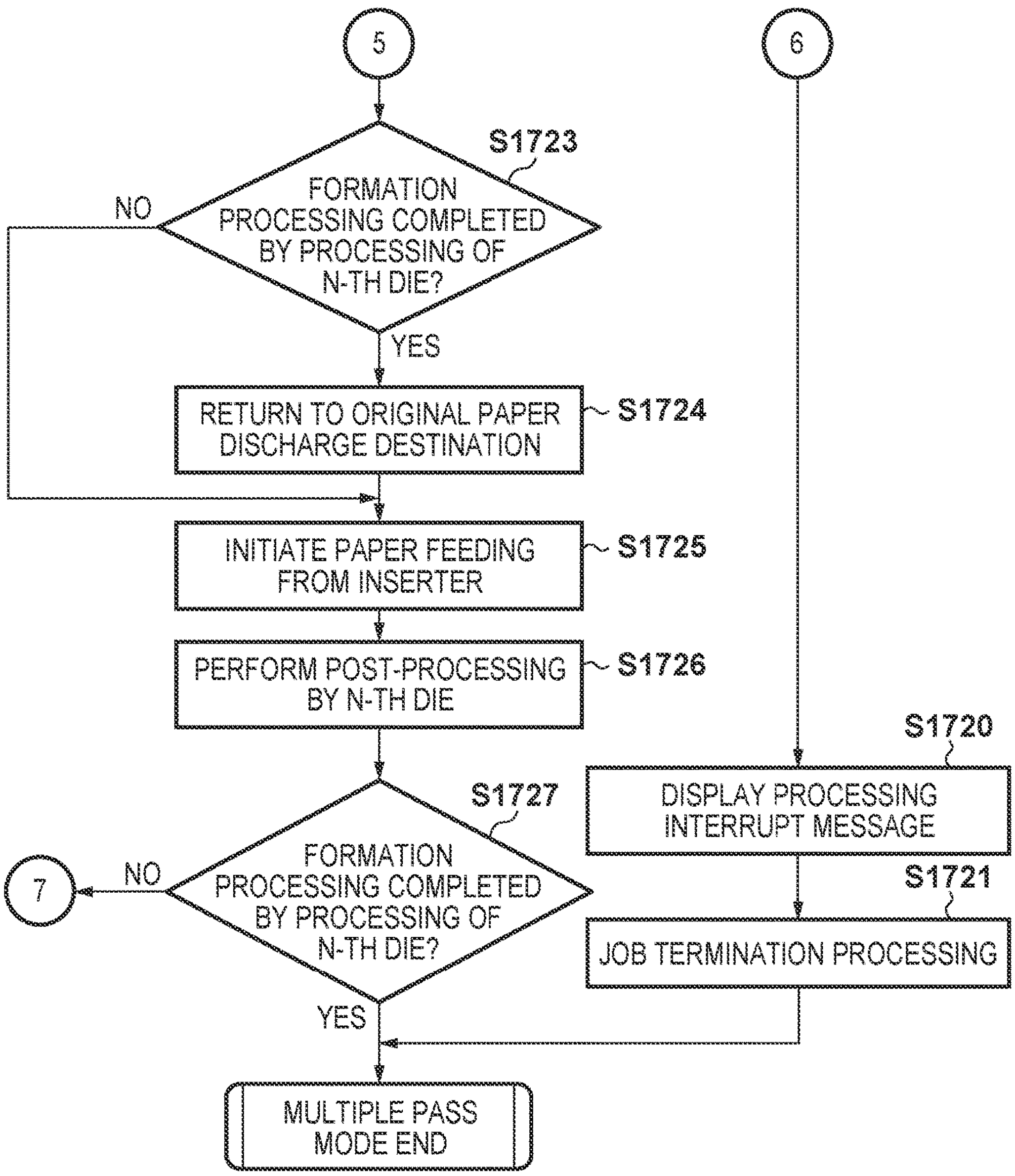
FIG. 17C is a flowchart of a process performed by the image forming apparatus main body 203.

Concerning the processing the image forming apparatus main body 203 performs, an explanation will be given using FIG. 17A and FIG. 17C. Additionally, since the process for each step of step S1701-step S1704 in FIG. 17A is the same as step S1501-step S1504 described above, an explanation of these steps will be omitted.

In step S1705, the device control unit 1102 analyzes configuration information and finishing information, and selects either a single pass mode or a multiple pass mode. For example, configuration information is analyzed, and when the number of print copies is one copy a single pass mode is selected, and when it is multiple copies a multiple pass mode is selected.

Then, when in step S1705 a single pass mode is selected, the processing proceeds to step S1707 through step S1706, and when a multiple pass mode is selected, the processing proceeds to step S1708 through step S1706.

In step S1707, similarly to in the first embodiment, post-processing and print processing is performed. After processing for step S1707 is completed, the processing according to the flowchart of FIG. 17A is completed.

On the other hand, in step S1708, the device control unit 1102 performs processing according to the multiple pass mode in step S1708. For details of the processing in step S1708, an explanation will be given using FIG. 17B and FIG. 17C.

In step S1709, the device control unit 1102 sets the paper discharge destination of a printed material to be the sample tray 711. Specifically, the device control unit 1102 instructs the finisher control unit 812 to discharge printed materials to the sample tray 711. Note that the paper discharge destination can be set to anywhere as long as it is not the paper discharge destination for performing finishing, and in this case it is made to be the sample tray 711.

In step S1710, the device control unit 1102 uses analyzed finishing information, and finalizes an order of the die for post-processing 604 that the post-processing device 205 uses, as well as position information by which post-processing is applied in units of sheets. Additionally, the finalized information is stored to the RAM 804 of the image forming apparatus main body 203 as post-processing information.

For example, in a case when setting is performed as in FIG. 12D, it is stored that first post-processing is applied to positions that are 190.0 [mm] and 230.0 [mm] from a leading edge of the sheet using the perforation die for the first-fourth sheets. Additionally, for the fifth sheet, it is stored that a creasing die is used secondly to apply post-processing at a position that is 210.0 [mm] from a leading edge of the sheet.

Next, in step S1711, the device control unit 1102 uses configuration information and finishing information to initiate printing consecutively print images of the first page-the fifth page that are received from the image processing apparatus 102, starting from the print image of the first page.

In step S1712, the device control unit 1102 initializes the variable N to 1 using the following processing.

In step S1713 the device control unit 1102 identifies the N-th die to be used from post-processing information that is managed by the RAM 804. In a case as in the above example, when N=1, the N-th used die is specified as the perforation die. Also, when N=2, the N-th used die is specified as the creasing die.

Then the device control unit 1102 makes an instruction to the post-processing device 205 (the CPU 902) to cause it to perform post-processing using the identified die. For example, in the example that is described above, in a case when N=1, an instruction is made such that the perforation is applied by the first die, which is the perforation die, at positions that are 190.0 [mm] and 230.0 [mm] from a leading edge of the sheet for the first-fourth sheets.

In step S1714, the device control unit 1102 skips post-processing that uses the (N+1)-th or later die. Additionally, since only post-processing is skipped, printing is continued. For example, when N=1, while sheet feeding is performed for sheets to which post-processing that uses the second die or later is performed, post-processing is not performed. In the present embodiment, the device control unit 1102 performs sheet feeding of the fifth sheet; however, it does not perform creasing, which is performed by the second die.

In step S1715, the device control unit 1102 increments a value of a variable N by 1.

In step S1716, the device control unit 1102 instructs the UI processing unit 1101 to display the following message window to the operation panel 425. In other words, the message window recites a message prompting a user to feed printed material discharged to the sample tray 711 into the inserter tray 503 of the inserter apparatus 204, and a message for notifying the user so that the user exchanges the current die with the N-th die. Printing is completed for this printed material, but post-processing for only those pages that require post-processing which uses the die currently mounted to the post-processing device 205 is applied to this printed material. As a result, this kind of a message window will be displayed on the display screen of the operation panel 425.

Figure 18A:
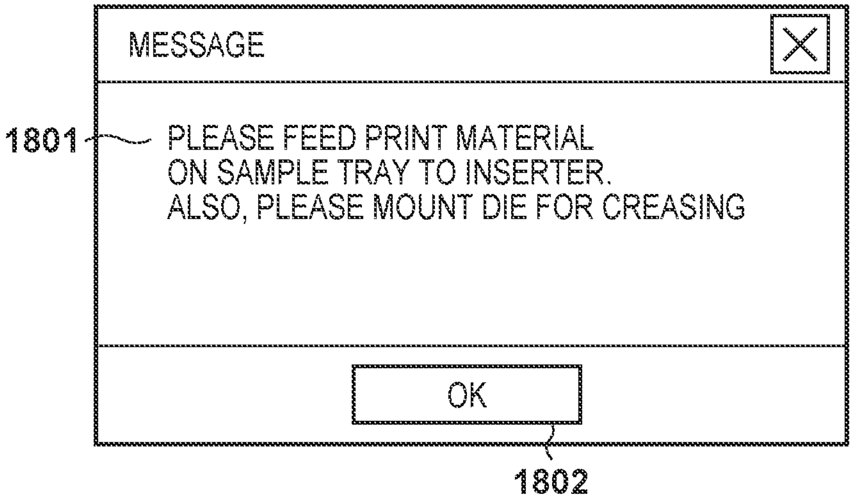
FIGS. 18A and 18B are views for illustrating examples of a message window.

An example of this kind of a message window is shown in FIG. 18A. FIG. 18A shows a message window on which a message 1801 that prompts a user to feed the printed material discharged to the sample tray 711 into the inserter tray 503 of the inserter apparatus 204, and prompts the user to exchange the current die with the creasing die is recited.

When the user confirms such a message window, the user instructs an OK button 1802. When the OK button 1802 is instructed, the UI processing unit 1101 deletes this message window, and the processing proceeds to step S1717.

In step S1717 the device control unit 1102 uses a timer function that the CPU 802 comprises, and starts timekeeping (sets a monitoring timer).

When the device control unit 1102 receives from the post-processing device 205 a notification to the effect that the user exchanged the current die with the N-th die, and receives a notification from the inserter apparatus 204 to the effect that a printed material has been fed to the inserter tray 503, the processing proceeds to step S1722 through step S1718. On the other hand, in a case where both notifications are not received, (when either side is not received), the processing proceeds to step S1719 through step S1718.

In the post-processing device 205, the die detection unit 905 is able to perform detection of whether or not a die is currently set to the post-processing device 205, and the die detection unit 905 is able to recognize the type of die that is currently set, and the CPU 902 of the post-processing device 205 is notified of the result of this detection/recognition. The CPU 902 notifies the CPU 802 of the image forming apparatus main body 203 of the content that it was notified of. On the image forming apparatus main body 203 side, it can be recognized whether or not a die is currently set to the post-processing device 205, and what type of die is currently set.

In the case of the present embodiment, when it is determined whether or not the die that is currently set to the post-processing device 205 is the creasing die, which is the second die, and it is determined that it is the creasing die that is the second die, it is determined to be exchanged, it is determined that the dies have been exchanged.

Also, the sheet detecting sensor 504 in the inserter apparatus 204 is able to detect whether or not sheet feeding to the current inserter tray 503 is being performed, and the result of this detection is communicated to the CPU 802 of the image forming apparatus main body 203. On the image forming apparatus main body 203 side, it is possible to recognize whether or not printed material is being fed to the current inserter tray 503.

In step S1719, the device control unit 1102 determines whether or not a predetermined time has elapsed (times out) from when the timekeeping was initiated in step S1717. As a result of this determination, when the predetermined time has elapsed, the processing proceeds to step S1720. Meanwhile, when the predetermined time has not elapsed yet, the processing proceeds to step S1718.

Figure 18B:
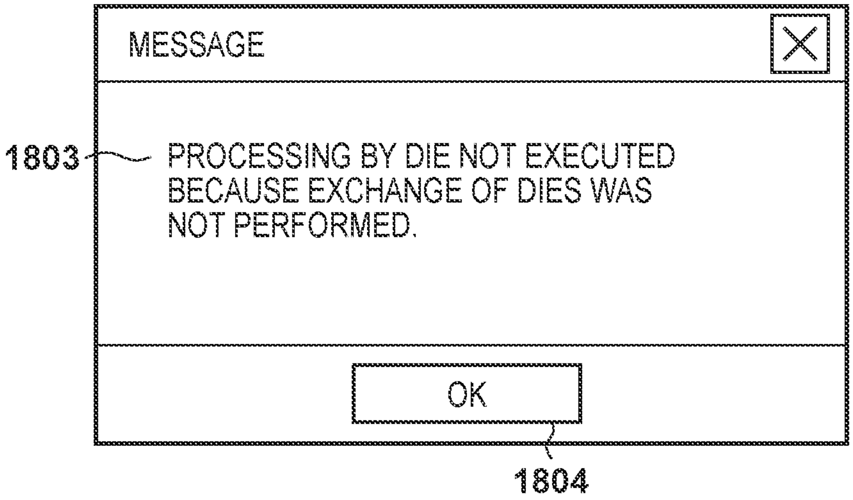

In step S1720 the device control unit 1102 instructs the UI processing unit 1101 to display to the operation panel 425 a message window which recites a message for notifying that since an exchange of die was not performed, post-processing that uses the die is terminated. An example of this kind of a message window is shown in FIG. 18B. FIG. 18B shows a message window which recites a message 1803 for notifying that since an exchange of die was not performed, post-processing that uses the die is terminated.

When the user confirms this kind of message window, the user instructs an OK button 1804, and when the OK button 1804 is instructed, the UI processing unit 1101 deletes the message window and the processing proceeds to step S1721. In step S1721, the device control unit 1102 discards information stored to the RAM 804 and terminates processing of a print job.

Meanwhile, in step S1722 the device control unit 1102 ends timekeeping that was initiated in step S1717.

In step S1723, the device control unit 1102 determines whether or not post-processing that uses the (N+1)-th die is registered in post-processing information, in other words the device control unit 1102 determines whether or not formation processing for which the N-th die is required is completed. In a case when the result of the determination is that post-processing that uses the (N+1)-th die is registered, the processing proceeds to step S1725, and in a case when post-processing that uses the (N+1)-th die is not registered, the processing proceeds to step S1724.

For example, in the above example, in a case when N=2, it is determined whether or not formation processing that requires post-processing that uses the second die is completed. In the present embodiment, when post-processing is performed that uses a creasing die, which is the second die, since processing for forming the printed material is completed, the processing proceeds to step S1724.

In step S1724, the device control unit 1102 returns the printed material paper discharge destination set in step S1709 to the original paper discharge destination. In the present embodiment, since formation of a saddle stitch binding is requested, the paper discharge destination of the printed material is returned to the saddle stacking unit 722. Additionally, specifically, the device control unit 1102 controls the finisher control unit 812 to instruct that the printed material be discharged to the saddle stacking unit 722.

In step S1725, the device control unit 1102 controls the sheet feeding apparatus control unit 810 to instruct so that paper is fed from the inserter tray 503. In the present embodiment, feeding of the printed material placed to the inserter tray 503 (the printed material to which post-processing is applied by the die for perforation, which is the first die) is started by the user.

In step S1726 the device control unit 1102 identifies the N-th die used from post-processing information that is managed by the RAM 804. Then the device control unit 1102 makes an instruction to the post-processing device 205 to cause it to perform post-processing using the identified die. For example, in the example above, when N=2, an instruction is made to perform post-processing that uses the second die. In the present embodiment, the device control unit 1102 instructs so that the creasing die, which is the second die, applies a crease at a position that is 210.0 [mm] from the leading edge of the sheet for the fifth sheet.

In step S1727, the device control unit 1102 determines whether or not post-processing that uses the (N+1)-th die is registered in post-processing information. In a case when the result of this determination is that post-processing that uses the (N+1)-th die is registered, the processing proceeds to step S1715, and in a case when it is not registered, the processing according to the flowchart of FIG. 17A is completed.

For example, in the above example, in a case when N=2, it is determined whether or not formation processing that requires post-processing that uses the second die is completed. In the present embodiment, when performing post-processing that uses a creasing die, which is the second die, processing in a multiple pass mode is ended because formation on the printed material is completed.

In the present embodiment, since there is no process that uses the third die, the processing ends here. However, in a case when there is processing that uses the third die, loop processing of step S1715-step S1727 is performed.

By this processing, the number of times of exchanging of the die for post-processing 604 is minimized, and it is possible to further improve the work efficiency of a user. Additionally, in the explanation above, an explanation is given for an example of performing sheet feeding from the inserter tray 503. When sheet feeding is performed from the inserter according to the present embodiment, since printed material does not go through the first fixing unit 413 or the second fixing unit 414 of the image forming apparatus main body 203, there is a merit that deterioration of a tint of printed material due to a factor such as heating or the like is prevented.

Additionally, regarding the mode determination processing of step S1705, a supplement is provided using FIGS. 19A-19D. FIGS. 19A-19D show a resulting document to which creasing is applied to a cover of a saddle stitch binding, and hole punching (punching) is applied in order to close a binder or the like.

Figure 19A:
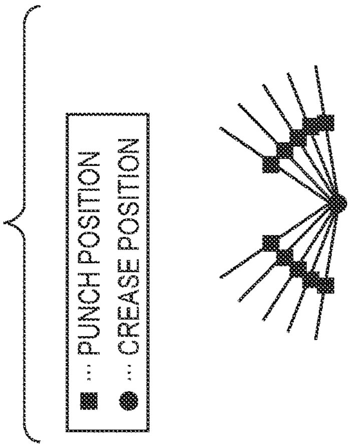
FIGS. 19A-19D are figures supplementing a mode determination process of step S1705.
Figure 19B:
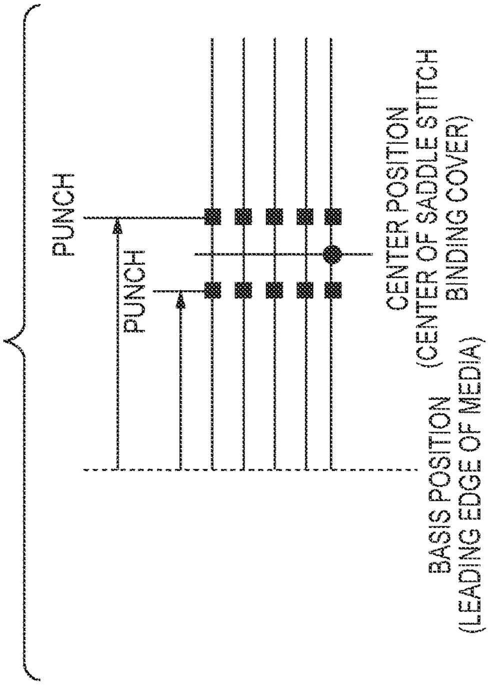

FIG. 19A represents a formed saddle stitch binding, and it is comprised of 5 sheets in the A3 size. FIG. 19B shows a breakdown of the saddle stitch binding in FIG. 19A in units of sheets. It is shown that creasing and punching processes are applied to a central portion of the sheet of the cover.

Figure 19C:
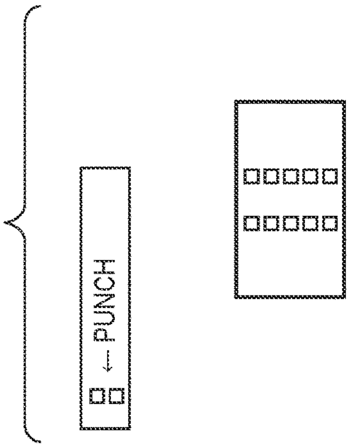
Figure 19D:
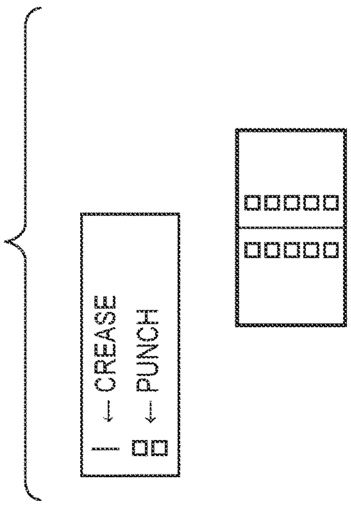

FIG. 19C is a view of the body of the saddle stitch binding from the perspective of the upper side, and it is shown that 2 hole (punch) processing is applied to the A3 size sheet. FIG. 19D is a view of the cover of the saddle stitch binding from a perspective of the upper side, and shows one crease processing and two hole (punch) processing is performed on the A3 size sheet.

When forming the printed materials of FIGS. 19A-19D, and processing using the single pass mode, exchange of the die for punching and the creasing die is performed two times, while when processing using the multiple pass mode exchange of a die need only be performed one time. Accordingly, a process for selecting the multiple pass mode may be added in the mode determination processing in step S1705 when it is determined if multiple post-processes are applied to a single sheet, and it is determined that multiple post-processes are applied. Of course, various things can be considered as a condition for mode determination, and there is not limitation to a particular condition.

Additionally, the configuration shown in FIG. 1 is only one example as described above, and various configurations can be considered. For example, the processes that were explained as being performed by the image processing apparatus 102 can be performed by the image forming apparatus main body 203, and the image processing apparatus 102 may be omitted. In such a case, the image forming apparatus main body 203 performs direct communication with the information processing apparatus 103.

Also, a configuration may also be taken such that the processes explained as being performed by the information processing apparatus 103 and the processes explained as being performed by the image processing apparatus 102 are performed by a single apparatus (which may be the information processing apparatus 103 or the image processing apparatus 102). In such a case, the single apparatus is arranged in place of the image processing apparatus 102 and the information processing apparatus 103, and the image forming apparatus main body 203 performs direct communication with this single apparatus.

Additionally, in the present embodiment, the following configuration is merely one example of an image forming apparatus for which exchange of die is possible. In other words, out of the pages for which printing is performed, post-processing that uses the first die is performed on a sheet of a page for which post-processing that uses the first die mounted to the image forming apparatus is set. Then after performing the post-processing, the user is notified so that the user exchanges the first die that is mounted to the image forming apparatus with a second die that is different from the first die.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-123818, filed Jun. 16, 2014, which is hereby incorporated by reference herein in its entirety.

The invention claimed is:

1. A printing system comprising:

a printing unit configured to print an image on a sheet;

a sheet processing unit configured to perform a designated sheet process for the printed sheet using a single die for performing the designated sheet process out of a plurality of dies for performing sheet processes different from each other, wherein the single die for performing the designated sheet process is manually selected from the plurality of dies by a user and is manually attached to the sheet processing unit; and a control unit configured to control the printing unit, wherein, in a case where the single die for performing the designated sheet process is not attached to the sheet processing unit, it is determined, before the printing unit starts printing the image on a first sheet on which the printing unit prints the image firstly among sheets on which the designated sheet process is to be performed, not to perform the designated sheet process for the sheets on which the designated sheet process is to be performed, and the printing unit starts printing the image on the sheets on which the designated sheet process is to be performed after the determination.

2. The printing system according to claim 1, further comprising a notification unit configured to notify a user of information, wherein in a case where the single die for performing the designated sheet process is not attached to the sheet processing unit, the control unit is configured to control the notification unit to notify the user of information indicating the single die for performing the designated sheet process.

3. The printing system according to claim 2, wherein in a case where the single die for performing the designated sheet process is attached to the sheet processing unit after the notification unit notifies the user of the information, the control unit is configured to control the printing unit to start printing.

4. The printing system according to claim 1, wherein the sheet processing unit comprises a detection unit configured to detect a type of a die attached to the sheet processing unit.

5. The printing system according to claim 4, wherein the control unit is configured to determine whether or not the single die for performing the designated sheet process is attached to the sheet processing unit by comparing a type of the single die for performing the designated sheet process with the type of the die detected by the detection unit.

6. The printing system according to claim 2, further comprising a reception unit configured to receive a print job, wherein in a case where a first sheet process and a second sheet process are set to the print job received by the reception unit, the control unit is configured to control the notification unit so as to prompt the user to exchange a die after one of the first sheet process and second sheet process is completed and before starting print on a sheet on which another of the first sheet process and second sheet process is performed.

7. A method of controlling a printing system configured to print an image on a sheet, the method comprising:

performing a designated sheet process for the printed sheet using a single die for performing the designated sheet process out of a plurality of dies for performing sheet processes different from each other, wherein the single die for performing the designated sheet process is manually selected from the plurality of dies by a user and is manually attached; and in a case where the single die for performing the designated sheet process is not attached to the printing system, determining, before starting printing the image on a first sheet on which the image is printed firstly among sheets on which the designated sheet process is to be performed, not to perform the designated sheet process for the sheets on which the designated sheet process is to be performed and starting printing the image on the sheets on which the designated sheet process is to be performed after the determination.

8. The printing system according to claim 2, wherein in a case where the single die for performing the designated sheet process is not attached to the sheet processing unit, the control unit is configured to control the notification unit to prompt the user to exchange a die.

9. The printing system according to claim 2, wherein the control unit is configured to determine whether or not the single die for performing the designated sheet process is attached to the sheet processing unit after the notification unit has notified the user of the information by comparing a type of the single die for performing the designated sheet process with a type of a die attached to the sheet processing unit.

10. The printing system according to claim 1, wherein, when previous sheet processing which is to be performed immediately before the designated sheet process is completed, the designated sheet process is caused to be suspended and then whether the single die for performing the designated sheet process is attached to the sheet processing unit is determined.

* * * * *